(12) United States Patent
Hassan Hussein et al.

(10) Patent No.: US 11,387,946 B2
(45) Date of Patent: Jul. 12, 2022

(54) RELIABLE ULTRA-LOW LATENCY COMMUNICATIONS

(71) Applicant: Fraunhofer-Gesellschaft zur Foerderung der angewandten Forschung e.V., Munich (DE)

(72) Inventors: Khaled Shawky Hassan Hussein, Erlangen (DE); Thomas Fehrenbach, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/712,884

(22) Filed: Dec. 12, 2019

(65) Prior Publication Data

US 2020/0119853 A1    Apr. 16, 2020

Related U.S. Application Data

(63) Continuation of application No. PCT/EP2018/065735, filed on Jun. 13, 2018.

(30) Foreign Application Priority Data

Jun. 14, 2017    (EP) .................... 17176135

(51) Int. Cl.
H04L 1/18    (2006.01)
H04L 5/00    (2006.01)

(52) U.S. Cl.
CPC .......... *H04L 1/1809* (2013.01); *H04L 1/1816* (2013.01); *H04L 1/1858* (2013.01);
(Continued)

(58) Field of Classification Search
CPC ... H04L 1/1809; H04L 1/1816; H04L 1/1858; H04L 1/1874; H04L 5/0055;
(Continued)

(56) References Cited

U.S. PATENT DOCUMENTS 5,162,791 A    11/1992 Heegard
9,252,930 B2    2/2016 Qu et al.
(Continued)

FOREIGN PATENT DOCUMENTS

CN    1951042 A    4/2007
EP    1833182 A1    9/2007
(Continued)

OTHER PUBLICATIONS

Schlegel, Christian, et al., "Coordinated Multiuser Communications", p. 92-99, p. 92-99.
(Continued)

*Primary Examiner* — Yaotang Wang
(74) *Attorney, Agent, or Firm* — Perkins Coie LLP; Michael A. Glenn

(57) ABSTRACT

Methods and systems for communicating according to an automatic repeat request, ARQ, scheme, and/or hybrid ARQ, HARQ, scheme are provided. A method may include: performing a first data transmission on a dedicated resource on a first channel; simultaneously to the first data transmission or in a subsequent resource, performing at least one redundancy transmission.

33 Claims, 12 Drawing Sheets

(52) U.S. Cl.
CPC .......... *H04L 1/1874* (2013.01); *H04L 5/0055* (2013.01); *H04L 5/0082* (2013.01)

(58) Field of Classification Search
CPC ... H04L 5/0082; H04L 1/1887; H04L 1/1819; H04L 1/08; H04L 1/1812; H04L 1/1825; H04L 1/188; H04L 1/189
See application file for complete search history.

(56) References Cited

U.S. PATENT DOCUMENTS

| | | | |
|---|---|---|---|
| 10,568,129 | B2 | 2/2020 | Jeon et al. |
| 2004/0228320 | A1 | 11/2004 | Laroia et al. |
| 2005/0249118 | A1 | 11/2005 | Terry et al. |
| 2009/0150739 | A1 | 6/2009 | Park et al. |
| 2009/0279480 | A1 | 11/2009 | Rosenqvist et al. |
| 2010/0115366 | A1 | 5/2010 | Wang |
| 2010/0278121 | A1 | 11/2010 | Chun et al. |
| 2011/0051657 | A1 | 3/2011 | Li et al. |
| 2011/0078527 | A1* | 3/2011 | Seshadri ............... H04L 1/008 714/746 |
| 2011/0286498 | A1 | 11/2011 | Abrishamkar et al. |
| 2012/0057560 | A1 | 3/2012 | Park et al. |
| 2012/0213196 | A1 | 8/2012 | Chung et al. |
| 2013/0286835 | A1 | 10/2013 | Plamondon et al. |
| 2013/0294367 | A1 | 11/2013 | Jalloul et al. |
| 2013/0343273 | A1 | 12/2013 | Barbieri et al. |
| 2014/0050105 | A1* | 2/2014 | Wang ............... H04L 43/0888 370/252 |
| 2014/0092784 | A1 | 4/2014 | Khayrallah et al. |
| 2014/0192763 | A1 | 7/2014 | Eriksson et al. |
| 2014/0341165 | A1 | 11/2014 | Wang et al. |
| 2015/0049712 | A1 | 2/2015 | Chen et al. |
| 2015/0189546 | A1 | 7/2015 | Earnshaw et al. |
| 2015/0222394 | A1* | 8/2015 | Cheng ............... H04L 1/1861 370/280 |
| 2015/0263829 | A1 | 9/2015 | Nguyen et al. |
| 2015/0327275 | A1 | 11/2015 | Kwon et al. |
| 2016/0050667 | A1 | 2/2016 | Papasakellariou et al. |
| 2016/0057773 | A1 | 2/2016 | Quan et al. |
| 2016/0112162 | A1 | 4/2016 | Tabet et al. |
| 2016/0119105 | A1 | 4/2016 | Jiang et al. |
| 2016/0128090 | A1 | 5/2016 | Azarian Yazdi et al. |
| 2016/0270053 | A1 | 9/2016 | Zeng et al. |
| 2016/0286545 | A1 | 9/2016 | Luo et al. |
| 2017/0019894 | A1 | 1/2017 | Nimbalker et al. |
| 2017/0034845 | A1 | 2/2017 | Liu et al. |
| 2017/0207884 | A1* | 7/2017 | Jiang ............... H04L 1/1835 |
| 2017/0238272 | A1* | 8/2017 | You ............... H04L 5/0082 370/350 |
| 2018/0115382 | A1 | 4/2018 | Manolakos et al. |
| 2018/0332501 | A1* | 11/2018 | Tseng ............... H04L 1/189 |
| 2018/0332566 | A1 | 11/2018 | You et al. |
| 2020/0244405 | A1 | 7/2020 | Li et al. |

FOREIGN PATENT DOCUMENTS

| | | |
|---|---|---|
| EP | 2214340 A1 | 8/2010 |
| EP | 2521405 A1 | 11/2012 |
| EP | 2768171 A1 | 8/2014 |
| JP | 2009159440 A | 7/2009 |
| JP | 2011091677 A | 5/2011 |
| JP | 2015527791 A | 9/2015 |
| KR | 20160045750 A | 4/2016 |
| KR | 20170054218 A | 5/2017 |
| WO | 2010145799 A1 | 12/2010 |
| WO | 2016069159 A1 | 5/2016 |
| WO | 2016175631 A1 | 11/2016 |
| WO | 2016191985 A1 | 12/2016 |

OTHER PUBLICATIONS

"3GPP TS 36.211, Evolved Universal Terrestrial (EUTRA); "Physical Channels and Modulation"", Rel 14, V14.0.0, (Sep. 2016).
"3GPP TS 36.211, Evolved Universal Terrestrial Radio Access (EUTRA); "Physical Channels and Modulation"", Release 13, V13.1.0.
"3GPP TS 36.212, Evolved Universal Terrestrial Radio Access (EUTRA); "Multiplexing and channel coding"", Release 13, V13.1.0.
"3GPP TS 36.213, Evolved Universal Terrestrial Radio Access (EUTRA); "Physical layer procedures"", Release 13, V13.1.1, (Mar. 2016).
"R1-1700024. 3GPP TSG RAN WG1 NR Ad Hoc Meeting Support of URLLC in UL", Huawei, HiSilicon, Spokane, USA, Jan. 16-20, 2017.
"R1-1700375 3GPP TSG RAN WG1 NR Ad-Hoc Meeting, "Uplink URLLC Transmission without Grant"", Intel, Spokane, USA, Jan. 16-20, 2017.
"R1-1704481. 3GPP TSG RAN WG1 Meeting #88, Discussions on HARQ for grant-free UL URLLC", Fujitsu, Spokane, USA, Apr. 3-7, 2017.
"RP-150465, 3GPP TSG RAN Meeting #67, New SI proposal: Study on Latency reduction techniques for LTE", 3GPP RAN Plenary No. 67, Shanghai, China, Mar. 9-12, 2015.
Beh, Kian Chung, et al., "Performance evaluation of hybrid ARQ schemes of 3GPP LTE OFDMA system", K. C. Beh, A. Doufexi, and S. Armour, in Proceeding of IEEE 18th International Symposium on Personal, Indoor and Mobile Radio Communications (PIMRC), Athens, Greece, Sep. 2007, pp. 1-5., pp. 1-5.
Gudipati, Aditya et al., "Strider: automatic rate adaptation and collision handling.SIGCOMM Comput. Commun.", Rev. 41, 4 (Aug. 2011), 158-169, pp. 158-169.
Hui, J. Y. N., "Multiple accessing for the collision channel without feedback", IEEE Transactions on Vehicular Technology, vol. 33, No. 3, pp. 191-198, Aug. 1984, pp. 191-198.
Kurt, Tolga , et al., "Space-frequency coding reduces the collision rate in FH-OFDMA", IEEE Transactions on Wireless Communications, vol. 4, No. 5, pp. 2045-2050, Sep. 2005. doi: 10.1109/TWC.2005.8538, pp. 2045-2050.
Massey, James L., et al., "The collision channel without feedback", IEEE Trans. Inf. Theor. 31, 2 (Sep. 2006), 192-204. DOI=http://dx.doi.org/10.1109/TIT.1985.1057010.
Paolini, Enrico, et al., "Graph-Based Random Access for the Collision Channel without Feedback: Capacity Bound", Global Telecommunications Conference (GLOBECOM 2011), 2011 IEEE, Houston, TX, USA, 2011, pp. 1-5, pp. 1-5.
Parandeh Gheibi, Ali, et al., "Collision Helps—Algebraic Collision Recovery for Wireless Erasure Networks", CoRR abs/1001.1948 (2010).
Wang, H, et al., "Performance of TTI Bundling for VoIP In EUTRAN TDD Mode", Vehicular Technology Conference, 2009. VTC Spring 2009. IEEE 69th, Barcelona, pp. 1-5, pp. 1-5.
Weiner, M., et al., "Design of a low-latency, high-reliability wireless communication system for control applications", 2014 IEEE International Conference on Communications (ICC), Sydney, NSW, 2014, pp. 3829-3835, pp. 3829-3835.
Yan, Li, et al., "A Low-Latency Collaborative HARQ Scheme for Control/User-Plane Decoupled Railway Wireless Networks", IEEE Transactions on Intelligent Transportation Systems, vol. 17, No. 8, pp. 1-14, Aug. 2016, pp. 1-14.
Zhou, Yu, et al., "LTE Uplink Coverage Enhancement Techniques Based on Enhanced TTI Bundling", Wireless Communications, Networking and Mobile Computing (WiCOM), 2012 8th International Conference on, Shanghai, 2012, pp. 1-4, pp. 1-4.
"Uplink URLLC Transmission without Grant", Intel Corporation, R1-1701206,3GPP TSG RAN WG1 #AH, 3GPP, date of disclosure: (Jan. 18, 2017), Jan. 18, 2017.
Huawei, et al., "Data transmission for DL URLLC", R1-1706917, 3GPP TSG RAN WG1 #89, 3GPP, date of disclosure: (May 6, 2017), May 6, 2017.
Huawei, et al., "Link adaptation for URLLC transmission", R1-1708127, 3GPP TSG RAN WG1 #89, 3GPP, date of disclosure: (May 6, 2017), May 6, 2017.
Huawei, et al., "UL Grant-free transmission", R1-1701665, 3GPP TSG RAN WG1 #88, 3GPP, date of disclosure: (Feb. 6, 2017), Feb. 6, 2017.

(56) References Cited

OTHER PUBLICATIONS

Intel Corporation, "On UL grant free transmissions [online]", 3GPP TSG RAN WG1 #89 R1-1707407, Internet: <URL:http://www.3gpp.org/ftp/tsg_ran/WG1_RL1/TSGR1_89/Docs/R1-1707407.zip>, May 7, 2017, May 7, 2017, 9 pp.

ZTE, "HARQ for URLLC UL Grant-free transmission [online]", 3GPP TSG RAN WG1 #89,R1-1707166, May 6, 2017,, 5/6/217, 8 pp.

NTT Docoma, Inc, "UL data transmission without grant", [online], 3GPP TSG RAN WG1 #89 R1-1708479,Internet URL: http://www.3gpp.org/ftp/tsg_ran/WG1_RL1/TSGR1_89/Docs/R1-1708479.zip>,, May 6, 2017, pp. 1-3.

\* cited by examiner

RELIABLE ULTRA-LOW LATENCY COMMUNICATIONS

CROSS-REFERENCES TO RELATED APPLICATION

This application is a continuation of copending International Application No. PCT/EP2018/065735, filed Jun. 13, 2018, which is incorporated herein by reference in its entirety, and additionally claims priority from European Applications No. EP 17 176 135.6, filed Jun. 14, 2017, which is incorporated herein by reference in its entirety.

BACKGROUND OF THE INVENTION

Technical solutions provided here relate to transmissions of messages and redundancy transmissions, e.g., from a base station (BS) to a user equipment (UE) and/or vice versa.

In general terms, the effort of obtaining fast communications between a large number of transmitters/receivers may result in a reduction of reliability. Accordingly, fast retransmissions are needed.

In ultra-low latency communication, on the one hand, prescheduling (e.g., semi-persistence scheduling (SPS) with very low duty cycle is a key solution. On the other hand, the transmit-time interval (TTI, such as short-TTI), the radio frame size, and the hybrid automatic repeat request (HARQ) retransmission intervals for ultra-low latency communication have to be reduced.

Since most of the ultra-low latency use-cases also need high reliability, this puts a huge challenge on techniques such as the hybrid automatic repeat request, HARQ, design which are directed to support a reduced frame chart and short presentence cycle.

Examples below focus on the design of a semi-persistence incremental redundancy retransmission for ultra-low latency reliable communication in an open-loop or almost open-loop fashion.

Examples below refer to Latency-constrained (mission-critical) communication services, Multilevel QoS services, ultra-reliable communication, enhanced Multiple access (MA) scheme and MA channels.

Technical solutions described here permit to increase reliability of the transmissions, and may therefore be used for unreliable communication channels.

In the conventional technology, it has been attempted to increase reliability using the following strategies:
- TTI bundling, as sending multiple times (over multiple subframes-TTIs) the same information as a kind of redundancy or diversity (this costs a huge delay and only supported in UL) [6,7]
- Only using asynchronous HARQ with short TTI; does not guarantee low latency as sequence of retransmission may still occur [1-4]
- Flooding the transmission with multiple and ACK or a combined ACK is received for multiple of transport-blocks. This is still inducing delay due to latency in response if HARQ can correct very late. Additionally, it does not fit the SPS with short (or even normal) periods. [10]
- Providing extra hardware like relaying different fragments of the frames, but this might not be feasible in critical mission communication [8].
- HARQ-ACK bundling and multiplexing for feeding back multiple frames, still induce latency due to sequential retransmission [11]

SUMMARY

According to an embodiment, a method for communicating according to a hybrid automatic repeat request, HARQ, scheme may have the following steps: performing a first data transmission at a first channel; simultaneously to the first data transmission and/or in at least one subsequent physical resource, performing at least one redundancy transmission at a second channel; concluding or postponing the redundancy transmission when a stop condition or a postponing condition is met.

According to another embodiment, a method for receiving a data may have the following steps: receiving a first data at a first channel and, simultaneously and/or subsequently, receiving at least one redundancy data at a second channel, wherein the redundancy data are transmitted up to a concluding or postponing the redundancy transmission when a stop condition or a postponing condition is met; performing a validity check on the first data and/or the at least one redundancy data; and transmitting an acknowledgment, ACK, message if the validity check is positive for at least one of the first data and/or the at least one redundancy data, and/or transmitting a non-acknowledgment, NACK, message if the validity check is negative for the first data and/or the at least one redundancy data.

Another embodiment may have a device configured to: perform communications at a first channel; transmit a first data; subsequently and/or simultaneously, perform at least a redundancy transmission at a second channel; and conclude or postpone the redundancy transmission when a stop condition or a postponing condition is met.

Another embodiment may have a device configured to: receive a first data on a dedicated resource in a first channel and, simultaneously and/or subsequently, receive at least one redundancy data in the first or a second channel, wherein the redundancy data are transmitted up to a concluding or postponing the redundancy transmission when a stop condition or a postponing condition is met; perform a validity check on the first data and/or the at least one redundancy data; and transmit an acknowledgment, ACK, message and/or a non-acknowledgment, NACK, message on the basis of the result of the validity check.

In accordance with examples, a method for communicating according to an automatic repeat request, ARQ, scheme, and/or hybrid ARQ, HARQ, scheme, may comprise:
  performing a first data transmission;
  simultaneously to the first data transmission or in a subsequent physical resource, performing at least one redundancy transmission.
  Accordingly, reliability is increased.
  In accordance with examples, a method may comprise concluding or postponing the data retransmission when a stop condition or a postponing condition is met, the stop condition or the postponing condition comprising at least one of the following conditions or an "OR"-condition of at least two of the following conditions:
    an acknowledgment, ACK, message is received;
    a maximum number of retransmissions have been performed;
    a maximum timer is expired;
    other transmissions are transmitted or are to be transmitted.
  Accordingly, reliability is increased.
  In accordance with examples, a method may comprise:
    before performing the first data transmission and the at least one redundancy transmission, inserting data to be transmitted in a first transmission buffer associated to the first data transmission and inserting redundancy data in a second transmission buffer associated to the at least one redundancy transmission; and evacuating the second transmission buffer when a stop condition and/or a postponing condition is met.

Accordingly, it is possible to avoid useless retransmission with the same strategy that is used to perform the transmissions.

In accordance with examples, a method may comprise performing at least one redundancy transmission according to a chase combining scheme and/or a redundancy forward error correction.

Accordingly, reliability is increased.

In accordance with examples, the data transmissions and redundancy transmissions are in uplink, UL, and a method may comprise performing a listen-before-talk scheme or a scheme based on a sensing or a detection technique for performing the at least one redundancy transmission.

Accordingly, a valid technique for regulating the medium access between different UEs may be performed.

In accordance with examples, a method may comprise:
performing redundancy transmissions until a postponing condition is met;
waiting for a subsequent (dedicated or non-dedicated) resource at disposal for a redundancy transmission;
performing at least one additional redundancy transmission on the subsequent dedicated resource.

Accordingly, efficiency is increased.

For example, several HARQ redundancy transmissions may be performed, and, when there is no possibility anymore, a ARQ retransmission may be operated. Accordingly, there is the possibility of efficiently using the communication channels using HARQ and ARQ transmissions.

In accordance with examples, a method may comprise, in an initial step, measuring metrics at least in part associated to a network status for initiating the subsequent steps when the metrics are under an acceptable threshold.

Accordingly, methods above and/or below may advantageously be initiated only when necessary.

In accordance with examples, a method may comprise performing a scheduling to associate a plurality of dedicated resources to data to be transmitted in uplink, UL, and/or downlink, DL, so as to permit an association, in a first channel and/or a second channel, between the first dedicated resource and least one dedicated or non-dedicated resource subsequent or simultaneous to the first dedicated resource.

Accordingly, HARQ redundancy transmissions may be performed on a grant-free basis, which permits to avoid repetitions of HARQ transmissions when a correct message has been received.

In accordance with examples, a method may comprise measuring metrics at least in part associated to the status of the network, so as to assign more redundancy transmissions to devices suffering of low QoS and/or requesting urgent communications.

Accordingly, the network adapts to the conditions of UEs by permitting the lowest-performing UEs to have some additional resources to use.

In accordance with examples, a method may comprise determining a ranking of priorities, so as to assign more retransmissions to higher-priority transmissions.

In case of urgent communications (e.g., URLLC) more retransmissions are assigned, so as to increase reliability for the devices which perform the most important communications.

In accordance with examples, a method may comprise:
performing the first transmission at a first channel; and
performing the at least one redundancy transmission at a second channel.

In some examples, some channels may be reserved, for example, for HARQ transmission.

In accordance with examples, the first channel may comprise dedicated physical resources and the second channel may comprise grant-free physical resources.

In accordance with examples, a method for receiving a data may comprise:
receiving a first data and, simultaneously or subsequently, receiving at least one redundancy data;
performing a validity check on the first data and/or the at least one redundancy data; and
transmitting an acknowledgment, ACK, message if the validity check is positive for at least one of the first data and/or the at least one redundancy data, and/or
transmitting a non-acknowledgment, NACK, message if the validity check is negative for the first data and/or the at least one redundancy data.

In accordance with examples, a device may be configured to:
perform communications, at least some of the communications being according to a scheduling;
transmit a first data; and
subsequently or simultaneously, perform a redundancy transmission.

In accordance with examples, the device is a base station or a user equipment.

In accordance with examples, a device may be configured to:
receive a first data on a dedicated resource in a first channel and, simultaneously or subsequently, receive at least one redundancy data in the first or a second channel;
perform a validity check on the first data and/or the at least one redundancy data; and
transmit an acknowledgment, ACK, message and/or a non-acknowledgment, NACK, message on the basis of the result of the validity check.

In accordance with examples, a device may be configured to define a scheduling for a device/method as above/below.

In accordance with examples, a system may comprise at least two devices, the first device being a base station and the second device being a user equipment, wherein at least one of the two devices is configured to transmit data to the other device according to any of the methods above and/or below and/or operate as any of the devices above and/or below.

A redundancy transmission may be, for example, a complete retransmission of a data and/or transmission of a redundant part of a previous data.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
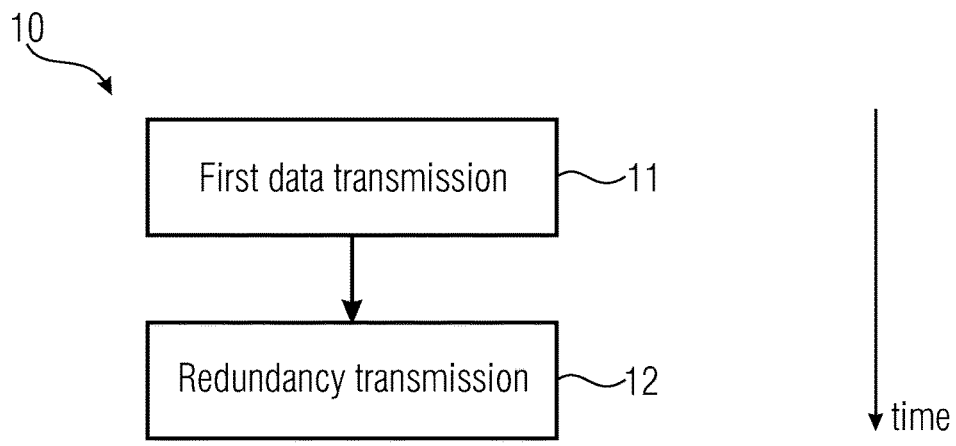
FIGS. 1a-1c show methods according to examples.
Figure 1B:
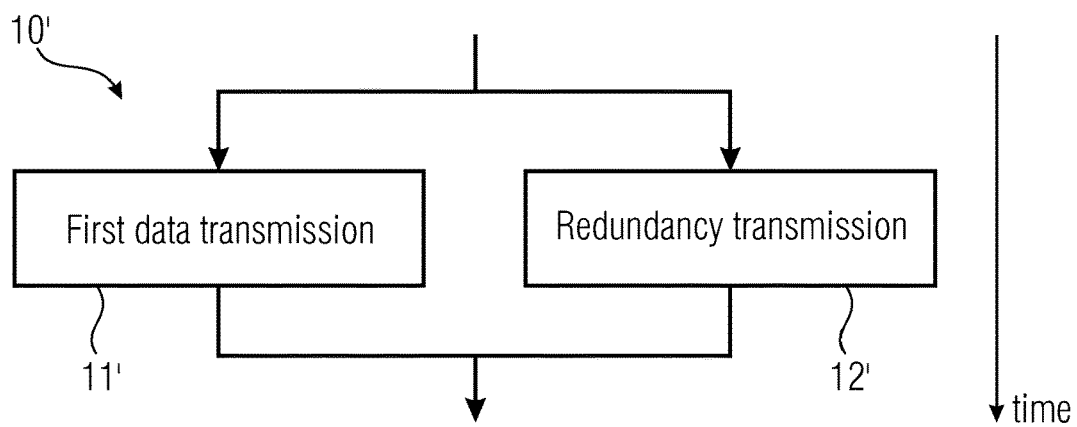
Figure 1C:
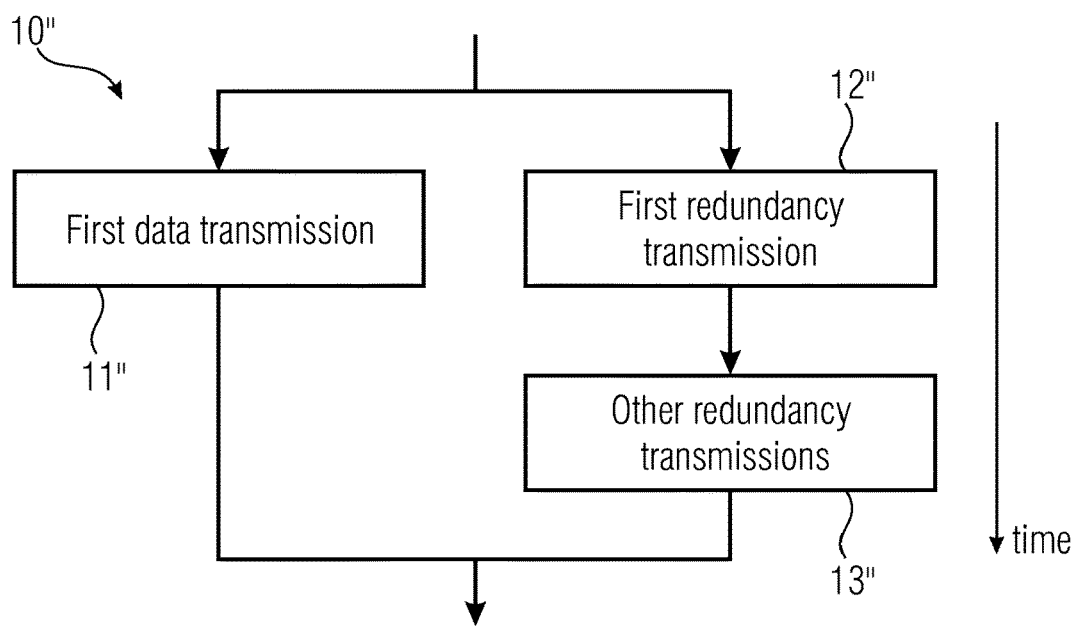

FIGS. 1a-1c shows methods 10, 10', 10" according to examples. The methods may be, for example, methods for transmitting automatic response request, ARQ, data and/or hybrid ARQ, HARQ, data.

FIG. 1a shows a method 10 with a block 11 in which a first data transmission is performed, e.g., by transmitting a first data to a receiver. The first data may be transmitted (in some examples, in a dedicated physical resource, in some examples, in a grant-free physical resource). The method 10 may comprise a block 12 of performing a redundancy transmission subsequently to block 11. The block 12 may be performed on a dedicated physical resource or in a grant-free physical resource, according to the examples. The block 12 may be performed by transmitting data on the same channel or on a different channel (e.g., on a different channel, for example), according to the examples.

FIG. 1b shows a method 10' with a block 11' in which a first data transmission is performed, e.g., by transmitting a first data to a receiver. The first data may be transmitted on a dedicated resource or, in other examples, in a grant-free resource. The method 10' may comprise a block 12' of performing a redundancy transmission simultaneously to block 11'. The block 12' may be performed on a dedicated resource or in a non-dedicated resource, according to the examples. The block 12' may be performed by transmitting data on a different channel with respect to the channel used in block 11'.

FIG. 1c is shows a method 10" with a block 11" in which a first data transmission is performed, e.g., by transmitting a first data to a receiver. The first data may be transmitted on a dedicated resource or in a grant-free resource, for example. The method 10" may comprise a block 12" of performing a first redundancy transmission simultaneously to block 11" and block 13" of performing a second redundancy transmission after blocks 11" and 12". The block 12" may be performed on a dedicated resource or on a non-dedicated resource, according to the examples. The block 12" may be performed by transmitting data on a different channel with respect to the channel used in block 11". The block 13" may be performed by transmitting data on the same or different channel used for block 11", according to examples. In some examples, the block 13" may comprise a retransmission of the redundancy data sent at block 12". In some examples, the block 13" may comprise a transmission of data which are redundancy data of those transmitted at 11". In some examples, the block 13" may comprise a retransmission of the redundancy transmission performed at block 11".

Each channel is a domain which is may be or (comprise or be a combination of) at least one of a frequency band(s), a time slot(s), a spatial channel(s), a code dimension(s), and/or a power level(s). Each channel may comprise a plurality, e.g. a sequence, of physical resources (e.g., multiple time slots of transmissions at the same frequency, for example, or multiple different channels).

Methods above and below may provide a communication under a standard for mobile communications, such as 3rd Generation Partnership Project (3GPP), 4G, 5G, long term evolution (LTE), NR, EPC, and so on. The communication may be according to universal mobile telecommunications system (UMTS) terrestrial radio access network (UTRAN) or an evolved UTRAN (eUTRAN). The communications may comprise time division duplex (TDD) transmissions (UL and/or DL transmissions). The communications may comprise frequency division duplex (FDD) transmissions (UL and/or DL transmissions). The BS may be an evolved node (eNB), a gNB (using the terminology of 5G) or, in general, a gNB/eNB. In some examples, a UE will use a BS as interface to a core network, e.g. evolved packet core (EPC) to setup a radio bearer with a certain QoS requirement. In NR, a UE can setup a service flow via gNB which is attached to a core network, e.g. EPC, to enable a packet-by-packet service flow.

In examples above and below, UEs may be, for example, devices which are chosen among mobile phones, smartphones, mobile/portable terminals, mobile/portable computers, tablets, relays, vehicular communication devices in cars, trucks, busses, mobile communication devices on drones or other aerial vehicles, and so on. At least some of the UEs may be internet of things, IoT, devices or communication devices connected to IoT devices.

Channels (which may be subdivided by the scheduling into dedicated resources and non-dedicated resources, e.g., in a temporal sequence) may be, for example, in at least one or a combination of the time domain, in the frequency domain, in the spatial domain, in the code domain, in the power domain. Multiplexing techniques in at least one of these domains may be performed.

With reference to the time domain, dedicated resources may comprise time slots assigned (e.g., by scheduling) for communications of UEs for UL and/or DL transmissions. Each time slot may be a in a channel assigned for UL or DL to a particular UE. A time slot may be a transmission time interval (TTI) or shortened TTI (sTTI), a group of TTIs, or a mini-slot (NR terminology).

With reference to the time domain, non-dedicated resources (grant-free physical resources) may comprise time slots which are not assigned to one UE.

With reference to the frequency domain, dedicated resources may comprise frequency bands assigned (e.g., by scheduling) distributed among the UEs for UL and/or DL transmissions. Each frequency band may be in a channel assigned to a particular UE.

With reference to the frequency domain, non-dedicated resources may comprise frequency bands which are not pre-assigned to one UE (e.g., during some time slots).

With reference to the spatial domain, dedicated resources may be in spatial channels (e.g., obtained by beamforming) assigned (e.g., by scheduling) to different UEs for UL and/or DL transmissions.

With reference to the spatial domain, non-dedicated resources may be in spatial channels which are not pre-assigned to one UE.

With reference to the code domain, dedicated resources may comprise code dimensions assigned (e.g., by scheduling) to different UEs for UL and/or DL transmissions, e.g. utilizing NOMA schemes.

With reference to the code domain, non-dedicated resources may comprise codes which are not pre-assigned to particular UEs.

With reference to the power domain, dedicated resources may comprise power levels assigned (e.g., by scheduling) to different UEs for performing UL transmissions. Each power value (e.g., a range of power levels) may be in a channel, which may be assigned to a particular UE. Multi-user superposition transmission (MUST) scheme may be used.

With reference to the power domain, non-dedicated resources may comprise power levels (e.g., power level ranges) which are not pre-assigned to a particular communication in UL and/or DL with a UE. For this kind of application, a non-orthogonal multiple access (NOMA) scheme may be used.

In some examples, each (dedicated or non-dedicated) physical resource may comprise a combination of a time domain, frequency domain, spatial domain, code domain, and/or power domain. For example, it may be decided (e.g., by scheduling and/or other resource allocations), by the scheduler (BS), that a particular UE transmits, during a first time slot, at first frequency band, in a first spatial channel, with first codes, at a first power level, and, during a second time slot, at a second frequency band, a second spatial channel, with second codes, at a second power level, and so on. Therefore, each physical resource (dedicated or non-dedicated) may be defined in any combination of time, frequency, spatial channels, codes and/or power levels, according to the embodiments.

Dedicated physical resources may be scheduled-based transmission grants. These can be:
  Dynamically scheduled grants (in UL and/or DL);
  Semi-persistent grants (in UL and/or DL);
  non-orthogonal multiple access (power-domain/code-domain/PDMA/SCMA/MUST); spatial-division multiple Access (UL/DL). Here multiple users share the same grants.

Grant-free physical resources (only in UL) may be resources which are shared by multiple UEs (e.g., clear grants)

Methods above and below may support automatic repeat request, ARQ, and/or hybrid ARQ, HARQ, techniques.

ARQ techniques are based on repeating, from the transmitter to the receiver, a previously transmitted data after the receiver has transmitted a non-acknowledgment, NACK, message. The receiver may discard the received data, for example, and wait for a new retransmission (redundancy transmission). In examples, the new retransmission may comprise exactly the same information (maybe precoded or differently encoded) of the transmitted data. In examples, the new retransmission is a redundancy transmission, as it repeats previously transmitted information.

HARQ techniques according to examples are based on retransmitting at least part of the previous transmitted message, e.g., with more and/or different redundancy. The retransmissions may be automatic, without waiting for a NACK message (e.g., hard HARQ). The retransmissions may be simultaneous to the first transmitted data (e.g., methods 10' and 10"). Different retransmissions may be retransmitted on different channels (e.g., different frequency bands, different spatial channels, different time slots, different conde dimensions, and/or different power levels).

In HARQ techniques according to examples, redundancy transmission s may contain only part of the original previously sent message. For example, in methods 10-10", the redundancy transmissions 12-12" and 13" may have only some redundancy data, and/or may be different from each other and/or from the first transmissions 11-11". Accordingly, a reduction of transmitted data may be obtained, hence decreasing the power consumption. In other HARQ techniques according to examples, the redundancy transmission s may be equal to the original previously sent message (maybe precoded or differently encoded).

In HARQ techniques according to examples, the receiver may store, without discarding, incorrectly decoded data. The receiver may, for example, try a combination between a first incorrectly decoded data and a second incorrectly decoded data (and in case additional received incorrectly decoded data), to reconstruct (determine) a proper version of the original data.

In HARQ techniques according to examples, the receiver may transmit a NACK message in case of the receiver is not able to reconstruct the original information.

In ARQ/HARQ techniques according to examples, it is possible to use chase combining techniques, in which the redundancy transmission s are the same. In some examples, the redundancy transmission s use incremental energy for redundancy transmissions to increase the probability that a retransmission is correctly decoded by the receiver.

In ARQ/HARQ techniques according to examples, it is possible to use incremental redundancy techniques, in which retransmissions are not exactly the same of the first data transmissions. At each retransmission, the receiver obtains additional information.

Hence, a redundancy transmission may be, for example:
  The repetition of a transmission (which may be the same of the first transmission); and/or
  The transmission of a redundancy data which at least partially repeats a part of the information encoded in the first transmission.

In some examples, methods below and above use scheduled schemes, in which at least some of the transmissions are scheduled (allocated between the UEs): for example, some physical resources may be exclusively dedicated to one single UE, while other physical resources may be exclusively dedicated to one other UE, so as to avoid collisions.

In some examples, methods below and above use grant-free (e.g., non-scheduled) schemes, in which at least some of the transmissions are not determined a priori: for example, at least some UL physical resources may be open to competition, so that it is not predetermined which UE accesses to the physical resource.

In some examples, methods below and above use schemes with both grant-free (e.g., non-scheduled) and dedicated resources, in which at least some of the transmissions are not determined a priori and some of the resources are scheduled: for example, some UL physical resources may be open to competition, so that it is not predetermined which UE accesses to the physical resource, while some other physical resources may be granted to some UEs.

In some examples, scheduling is dynamic scheduling. In some examples, scheduling is fixed scheduling. In some example, dynamic and fixed scheduling may coexist, e.g., by performing some communications using dynamic scheduling and some other communications with fixed scheduling.

Figure 2A:
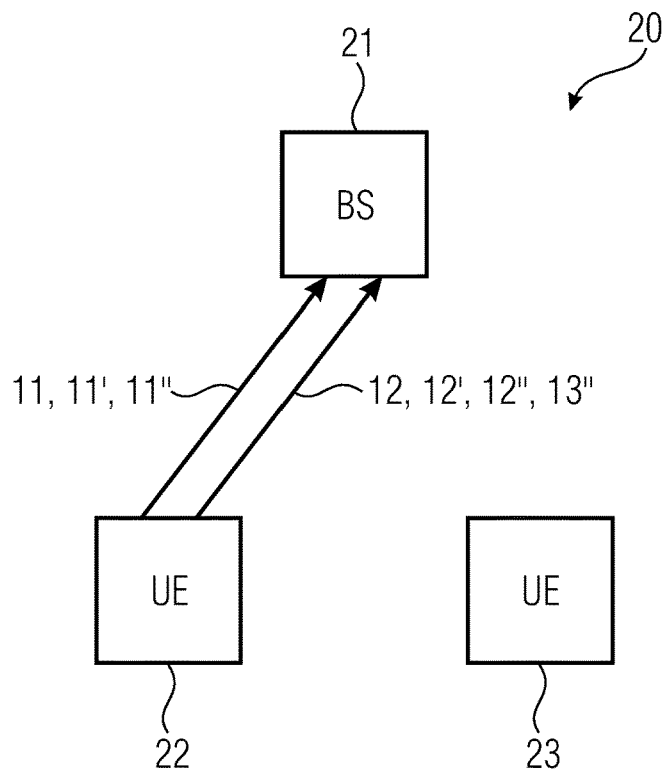
FIGS. 2a-2b show systems according to examples.

As can be seen from FIG. 2a, any of the methods 10-10" may be performed by at least one user equipment, UE 22, in uplink, UL, toward a base station, BS 21. The UE 22 and the BS 21 may form a system 20. The system 20 may comprise other UEs (e.g., UE 23). In some examples, according to the scheduling some dedicated resources in UL may be assigned to the first UE, while some other dedicated resources may be assigned to the other UEs. Other physical resources in UL, such as non-dedicated UL grants, may be open to competition (contention) between different UEs. In some examples, at a first component carrier (first channel) some time slots are assigned to UE 22 and some other time slots may be assigned to the UE 23 (dedicated resources or non-dedicated resources), while at a second component carrier (second channel) some time slots may be open to competition between different UEs (or dedicated resources in some examples).

Figure 2B:
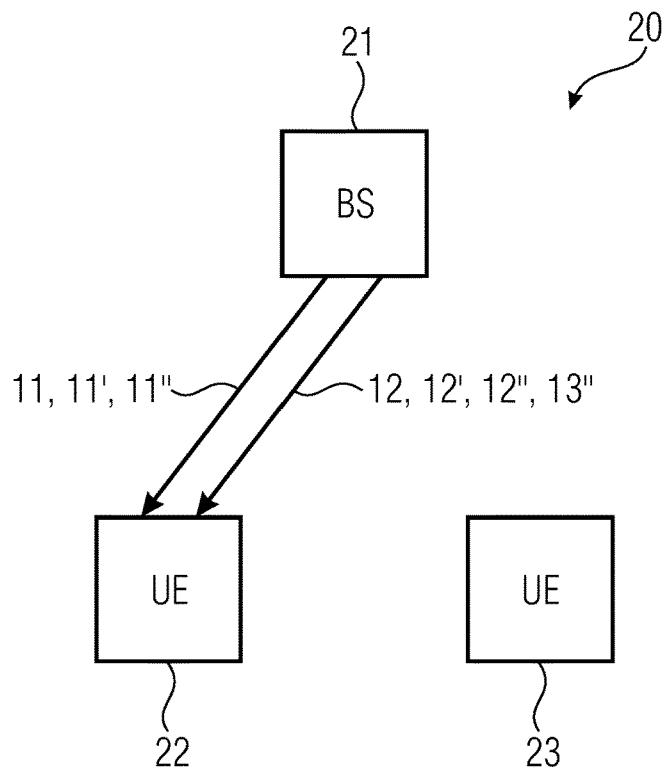

As can be seen from FIG. 2b, any of the methods 10-10" may be performed by a BS 21, in downlink, DL, toward at least one UE 22 or 23 (UE 22 in the instant shown in FIG. 2b). According to the scheduling, some dedicated resources in DL may be assigned to DL transmissions to the first UE 22, while some other dedicated resources may be assigned to the other UEs of the system. In some examples, at a first component carrier (first channel, for example) some time slots may be assigned to DL transmissions to the UE 22, while some other time slots may be assigned to DL transmissions to the UE 23. According to examples, in DL no non-dedicated resources are provided.

The communications of FIGS. 2a and 2b may be, for example, ARQ or HARQ transmissions.

Figure 3A:
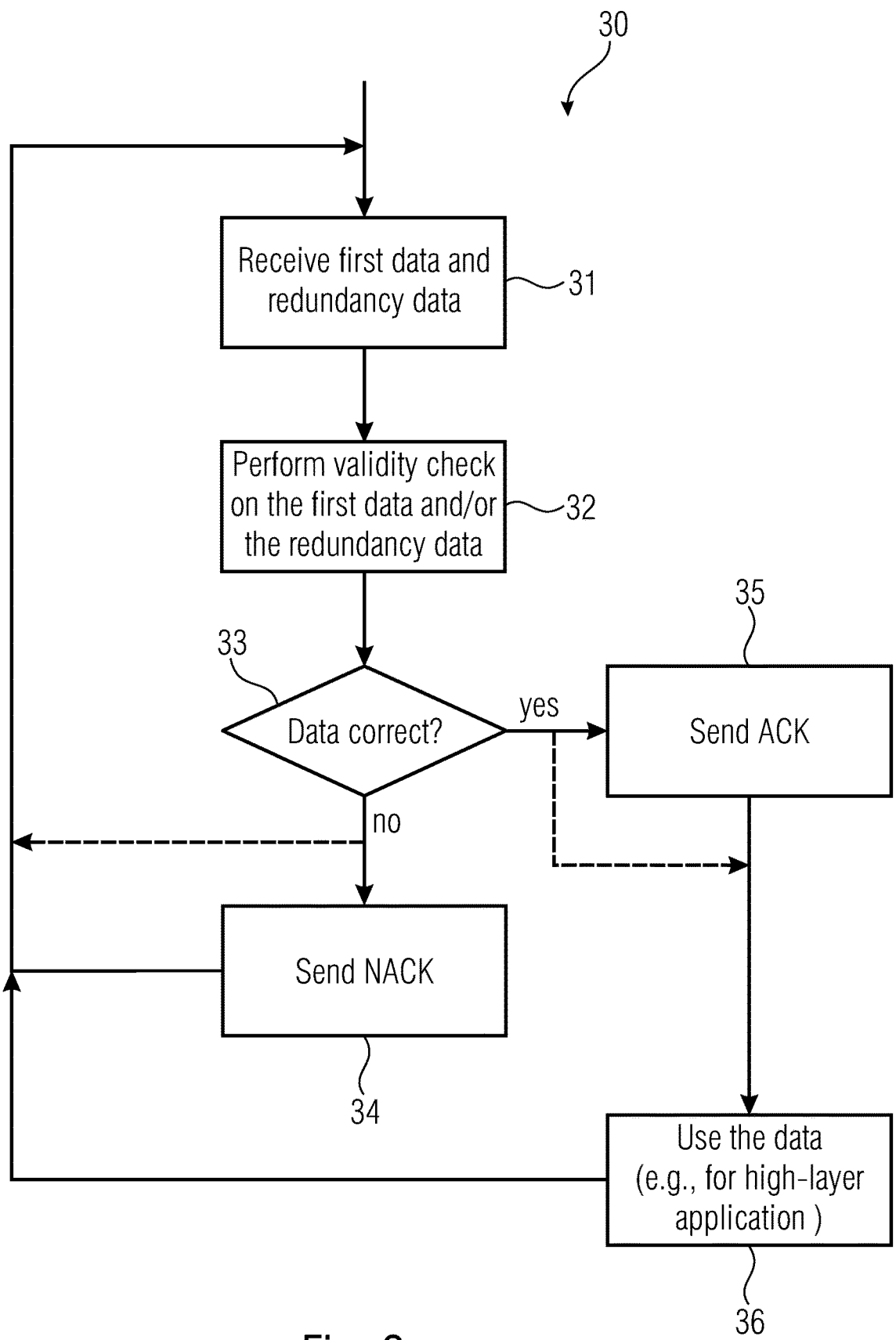
FIGS. 3a and 3b show methods according to examples.

FIG. 3a shows a method 30 which may be performed by a receiver (e.g., BS 21 in FIG. 2a, and/or UE 22 in FIG. 2b).

At block 31, the receiver may receive the first data 11-11" and/or the redundancy data 12-12" and/or 13". In examples with scheduling, the receiver knows the scheduling (e.g., it knows its dedicated resource on which it has right of transmitting). For non-dedicated resources, the receiver may derive the provenience, for example, from an identifier in the transmission or retransmission.

At block 32, the receiver may perform a validity check on the first data and/or the redundancy data. In examples, the blocks 31 and 32 may be performed simultaneously: while the validity of some retransmissions are checked, further retransmissions may be received. At block 32, the receiver may perform an analysis for determining whether the format of the first data and/or a redundancy data, as received, is valid, e.g., is compatible with a defined format or if (e.g., in view of noise, disturbances, and/or interference) some data (e.g., some data bits) in the message have been corrupted (modified, such as, for example, some "1's" bits are decoded as "0's" or vice versa). To perform this analysis, a validity check, such as a cyclic redundancy check (CRC), parity bit check, plausibility check, and so on, may be performed.

If the check determines the non-validity of the received data (e.g., the data is acknowledged as being corrupted), the receiver will move to block 31, waiting for new receptions. In some examples, the receiver may send a non-acknowledgment, NACK, message to the transmitter.

If the check determines the validity of the received data (e.g., the data is acknowledged as being corrupted), the receiver will move to block 36, wherein the data (either received as the first data or received as a redundancy data) will be used, for example, for a high-layer application (e.g., voice or data communication, and so on).

In examples, the receiver may acknowledge the received data, e.g., by transmitting an acknowledgment, ACK, message.

The ACK and/or NACK messages may be event-driven messages. The ACK and/or NACK messages may be transmitted on a channel (one of or a combination of frequency band, spatial channel, code dimension, time slot, power level, etc.) which is different from the first and second resources (e.g., different channels). The ACK and/or NACK messages may be transmitted in channels which are different from the channels used for the dedicated and/or non-dedicated resources. Therefore, the ACK and/or NACK messages may be, in some examples, transmitted at the same time of dedicated and/or non-dedicated resources. Block 34 and/or 35 may be bypassed in some examples.

Figure 3B:
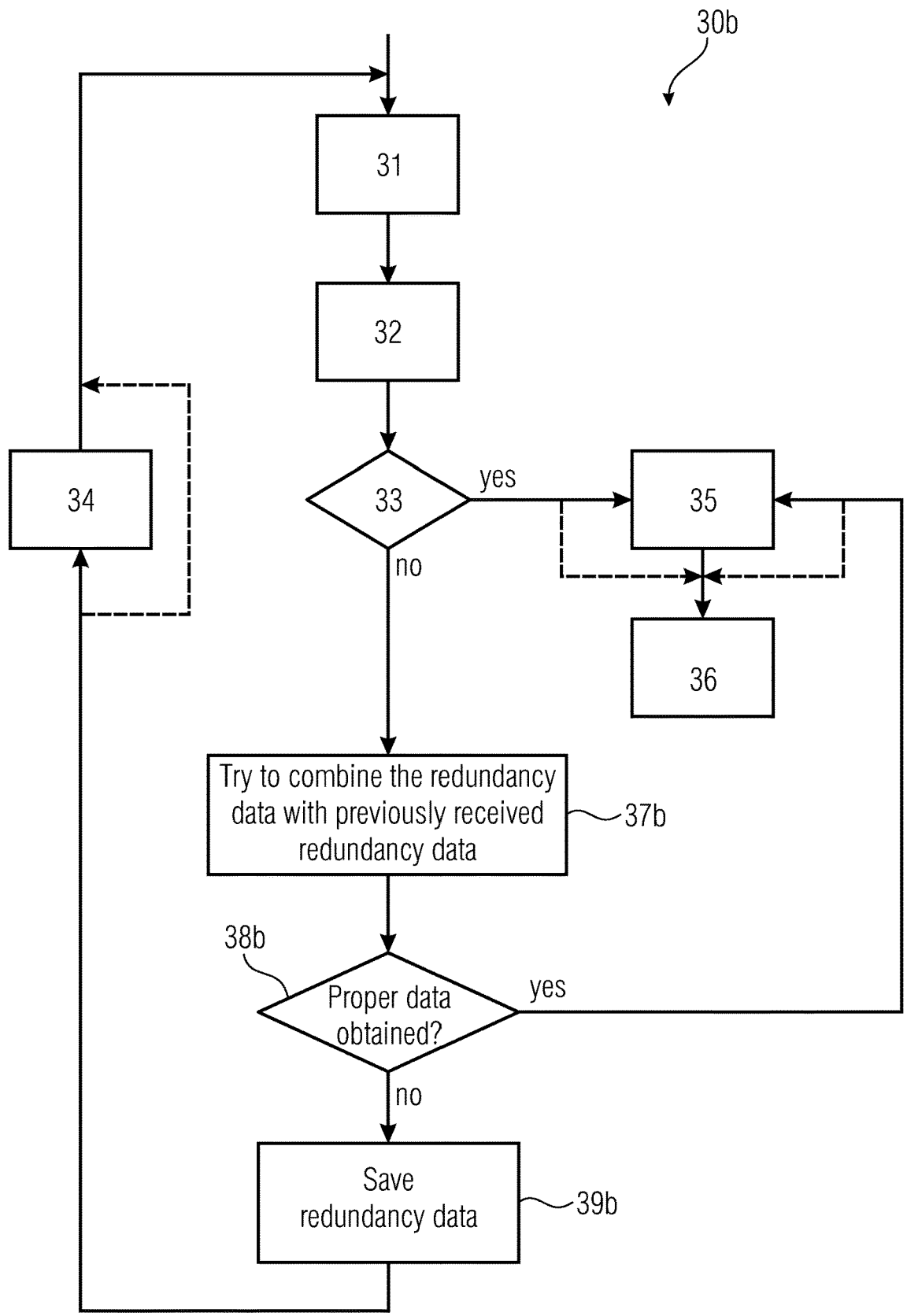

FIG. 3b shows a method 30b, according to examples, showing passages for performing HARQ receptions. The blocks 31-36, which may be the same of the method 30, are here not re-discussed.

If at 32 a received message is determined as being invalid (e.g., using CRC or another technique), at block 37b the receiver tries to combine the incorrectly received redundancy data with previously incorrectly received data (first transmitted data and/or redundancy). For example, in block 37b it may be tried to vary the obtained corrupted messages to obtain a message which is formally correct (e.g., with a correct CRC).

If, at block 38b, a correct data is reconstructed (obtained), the reconstructed data may be used at 36.

If, at block 38b, it is determined that a correct data cannot be reconstructed with sufficient confidence, the incorrectly received data is notwithstanding saved (stored) in a memory at 39b and a new redundancy transmission is waited for. Block 34 and/or 35 may be bypassed in some examples.

Figure 4A:
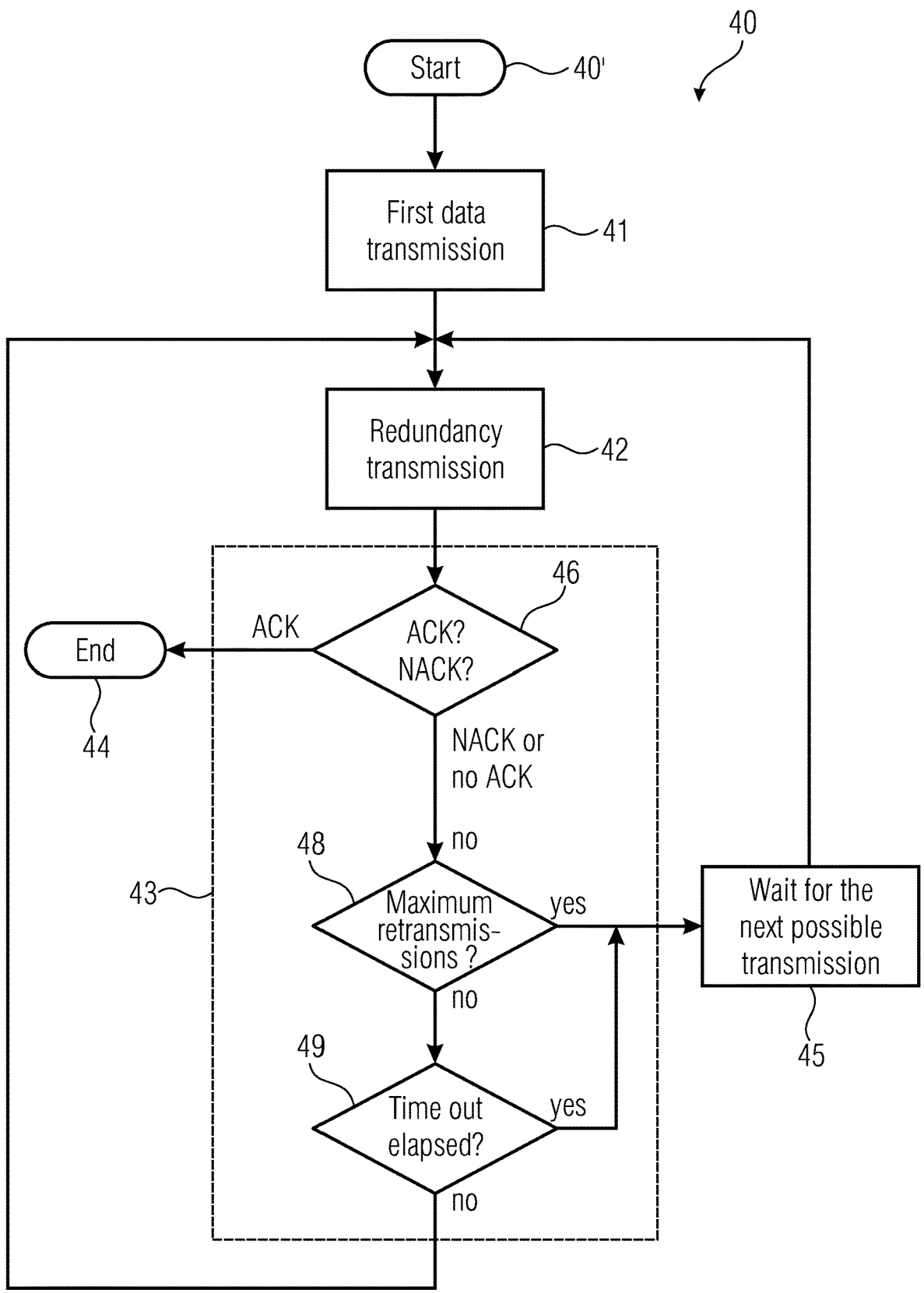
FIGS. 4a-4c show methods according to examples.

A detailed example 40 of any of the methods 10-10" is shown in FIG. 4a. The method may be either for UL or for DL. The method may start at 40'.

At block 41 (which may implement any of blocks 11-11"), a first data transmission may be performed on a first dedicated resource (in some examples) or in a grant-free resource (in some examples).

At block 42 (which may implement any of blocks 12-12" and 13"), at least one redundancy transmission may be performed (e.g., on a second dedicated resource). While blocks 41 and 42 are here represented in cascade, in some instances they may be actually be performed in parallel (e.g., by performing at least one redundancy transmission simultaneously to, but on a different channel of, the first transmission).

Block 43 is a decision block. The decision block 43 may determine if the data has been correctly received by the receiver and/or if the data is to be (partially or completely) retransmitted. If it is determined that the data has been correctly received, then the method 40 ends at block 44. In examples, the decision block 43 may check, e.g. at 46, if an ACK message has been obtained from the receiver (e.g., at block 35 of the method 30).

In examples, the decision block 43 may determine whether to perform further additional redundancy transmissions at block 42 and/or whether to wait (at 45) for a new dedicated resource for the retransmission. In examples, the decision block 43 may take into account NACK messages (e.g., at 46) or the absence of ACK messages. In examples, the decision block 43 (e.g., at 48) may take into account if a maximum number of redundancy transmissions has been performed. In examples, the decision block 43 (e.g., at 49) may take into account if a timeout has been reached by a timer. Therefore, the block 46 checks a stop condition for concluding the redundancy transmissions.

For example, if the decision block 43 is not aware that the receiver has correctly received at least one between the first data transmitted and at least one of the redundancy transmissions (e.g., output "NACK or no ACK" at block 46), but a maximum number of redundancy (re-)transmissions has not been performed yet (e.g., output "NO" at block 48) and there is enough time for a further retransmission (e.g., output "NO" at block 49), at least one further redundancy (re-)transmission may be performed at 42, e.g., immediately. An immediate retransmission may be performed, for example, in a dedicated resource immediately subsequent to the dedicated resource of the preceding redundancy transmission, e.g., according to examples and according to the particular scheduling. The same or a different channel may be used, according to the scheduling and the example. In some examples, in which the retransmission at 42 is to be performed in grant-free resources (e.g., in non-scheduled communications), at 45 the transmitted may sense or detect the physical resources (e.g., the channel) waiting for a non-occupied grant-free physical resource for performing a transmission.

Otherwise, if the if the decision block 43 is not aware that the receiver has correctly received at least one between the first data transmitted and at least one of the redundancy transmissions (e.g., output "NACK or no ACK" at block 46), but a maximum number of redundancy transmissions has been already performed (e.g., output "YES" at block 48) or there no enough time for a further retransmission (e.g., output "YES" at block 49), one will have to wait, at block 45, for the next resource (dedicated or grant-free, according the examples). Therefore, at blocks 48 and 49, conditions for postponing the redundancy transmissions (without concluding the redundancy transmissions) are checked.

In examples, the decision block 43 may determine whether to retransmit immediately a redundancy data or to wait for a subsequent dedicated resource before transmitting further redundancy data. According to examples based on scheduling, while a plurality of dedicated resources (e.g., time slots), immediately following the time slot in which the first data transmission has been performed, may be reserved to redundancy transmissions, sooner or later a dedicated resource shall be associated to a different communication (e.g., to a different receiver UE in case of DL or from a different UE in case of UL). Therefore, the block 45 may be used when there are no dedicated resources (or grant-free resources in some examples) at disposal of new redundancy transmissions for the same communication, while the data has not been correctly received yet.

In examples, a HARQ technique may be implemented by immediately performing redundancy transmission (in some cases, using incremental redundancy), while an ARQ technique is implemented by waiting (at 45) before performing a redundancy transmission (in some cases, by repeating the same transmissions in a new resource).

The redundancy transmission 42 may be, for example, a HARQ transmission. The redundancy transmission 42 may be, for example, a ARQ retransmission. In examples, the redundancy transmission may be redundant in the sense that the first transmitted data is repeated. In other examples, the redundancy transmission may be redundant in the sense that only a part (redundant part) of the first transmitted information is repeated (even if encoded in different way, encrypted, compressed, etc.). In examples, the redundancy transmission 42 may be of the incremental redundancy type. In examples, the redundancy transmission 42 may be of the chase combining type.

Figure 4B:
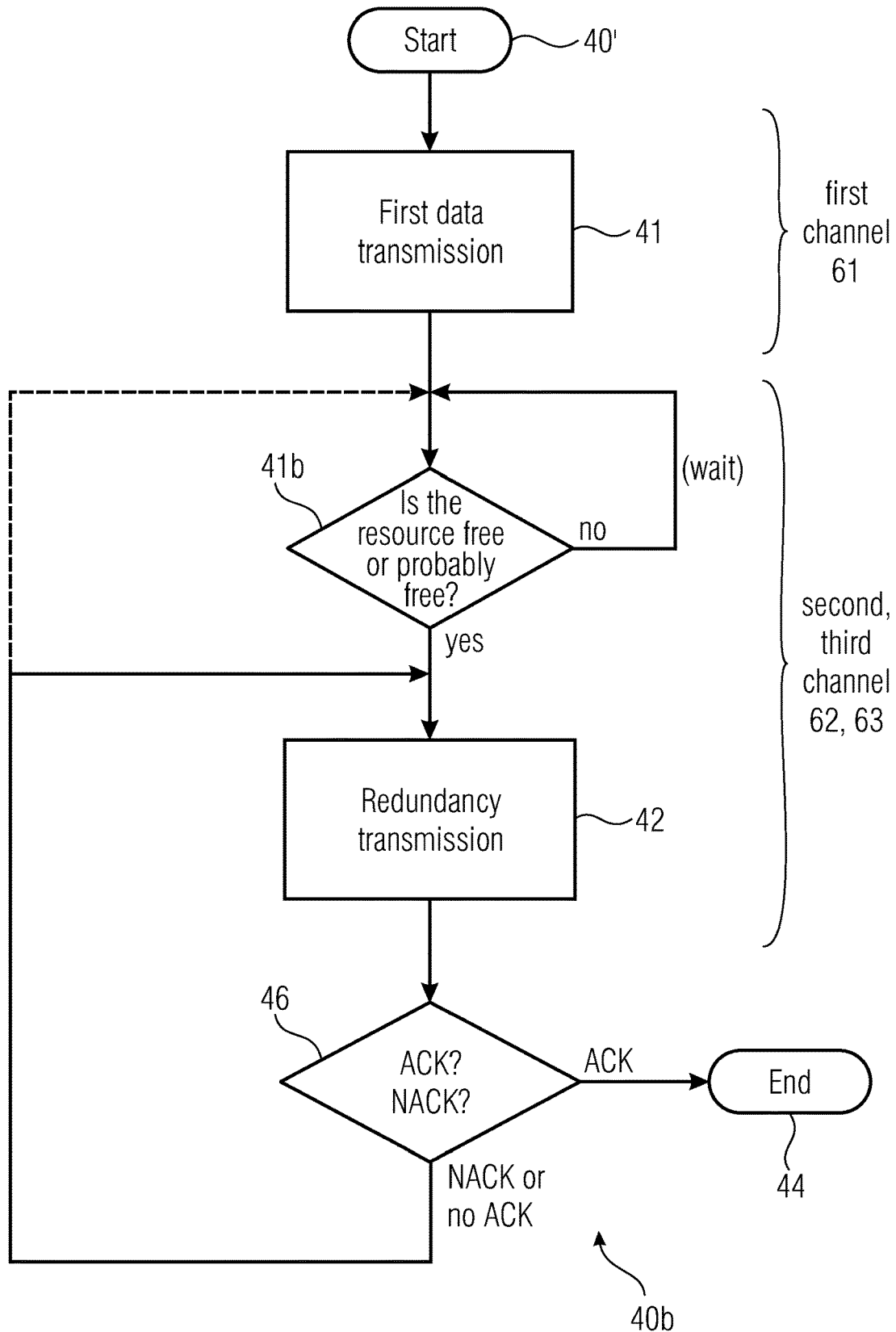

FIG. 4b shows an example 40b, which may implement, for example, a burst transmission. The method 40 b may be a method in which at least some transmissions (e.g., in at least one channel) are performed in grant-free resources, e.g., collisions between UL transmission from different UEs may occur. The method 40b may implement any of the methods 10-10". The method 40b may be used for solving the access competition between different UEs transmitting data to the BS. The method may start at 40'. At 41, a first data transmission (e.g., in a first channel 61) may be performed. The method 40b may be such that in some channels (e.g., first channel 61, e.g., at a first frequency band) the physical resources are dedicated (e.g., according to a scheduling), while in other channels (e.g., second channel 62 or third channel 63, which may have physical resources simultaneous to those in the first channel 61) the physical resources are grant-free. In other examples, all the channels are grant-free.

The method may comprise a block 41b of performing (e.g., in the second channel 62) a transmission on a on a grant-free resource in some examples. The method may comprise, at 41b, checking whether a non-dedicated resource (e.g., in the second channel 62, which may be a carrier component which is different from the carrier component associated to the first channel 61) is free or is probably free (the probability may be obtained stochastically). A listen-before-talk strategy may be used (other methods based on sensing and/on a detection may be implemented). A carrier sense multiple access (CSMA) technique, in some examples with collision detection (CSMA/CD) or with collision avoidance (CSMA/CA), may be used. In one example, the UE may wait for ACK/NACK messages from the BS, to understand if the next non-dedicated resource is free. If the non-dedicated resource is detected as being busy (e.g., a different UE is transmitting its own redundancy data), the transmitter will wait for the next non-dedicated resource.

When finally a free non-dedicated resource is detected, the redundancy (re)transmission(s) may be performed (e.g., in at least one channel 62 and/or 63, which may be different from the channel used for performing the first transmission) at block 42.

At block 46, it is established whether an ACK message or a NACK message has been received from the receiver (e.g., BS) for the transmission or redundancy transmission. If an ACK message is received, the method 40b ends at 44.

Otherwise, if no ACK message has been received, the method 40b may perform a new redundancy transmission at 42. In some examples, the method 40b may go at 41b to see whether the subsequent physical resource is occupied by other retransmissions.

Even if not shown in FIG. 4b, there is the possibility of also performing other checks, such as at least one of 48 and 49 of FIG. 4a.

It is worth noting that the method 40b may be extremely important in UL: as plurality of UEs may try to perform redundancy transmissions (each UE performing an instance of the method 40b), it is possible to determine which UE may transmit in each non-dedicated resource.

The redundancy transmissions 42 may be, for example, HARQ retransmissions, e.g., with incremental redundancy.

Figure 4C:
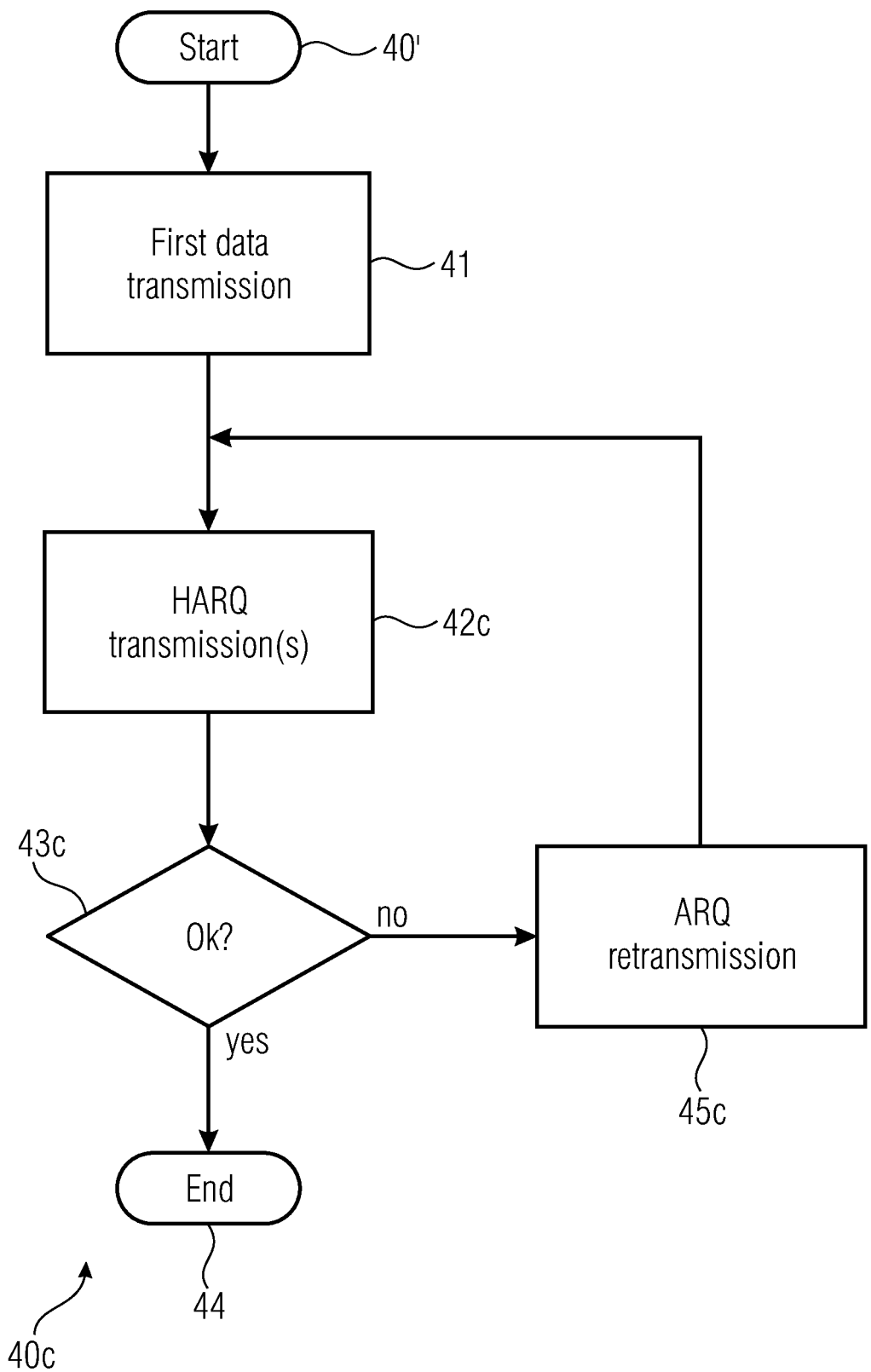

FIG. 4c shows an example 40c of a method. The method may start at block 40'.

The method 40c may comprise performing a first data transmission which may be, according to the specific example, on a dedicated resource or in a grant-free resource (it may be the same of block 42 of FIG. 4a). After the first transmission, HARQ transmissions (redundancy transmissions) may be performed at 42c. The HARQ retransmissions may be, for example, redundancy transmissions with incremental redundancy. In one example, block 42c may correspond to the cycle of blocks 42-46-58-49-42 of FIG. 4a. Therefore, many (re)transmissions may be performed at 42c.

At 43c, it is possible to check if, after the HARQ transmissions, a correct data has been accepted by the receiver. In positive case, the method ends at 44.

Otherwise, a ARQ retransmission (e.g., with increased power level) may be performed at 45c. It is possible to wait for the next dedicated resource associated to the transmitter for performing the ARQ retransmission. Block 45c may correspond to the sequence of blocks 45 and 42 in method 40 of FIG. 4a.

After 45c, it is possible to perform further HARQ retransmissions of the ARQ retransmission at a new instance of 42c. The cycle 42c-43c-45c of FIG. 4c may correspond to the cycle 42-46-48-49-45-42 of FIG. 4a.

Figure 5:
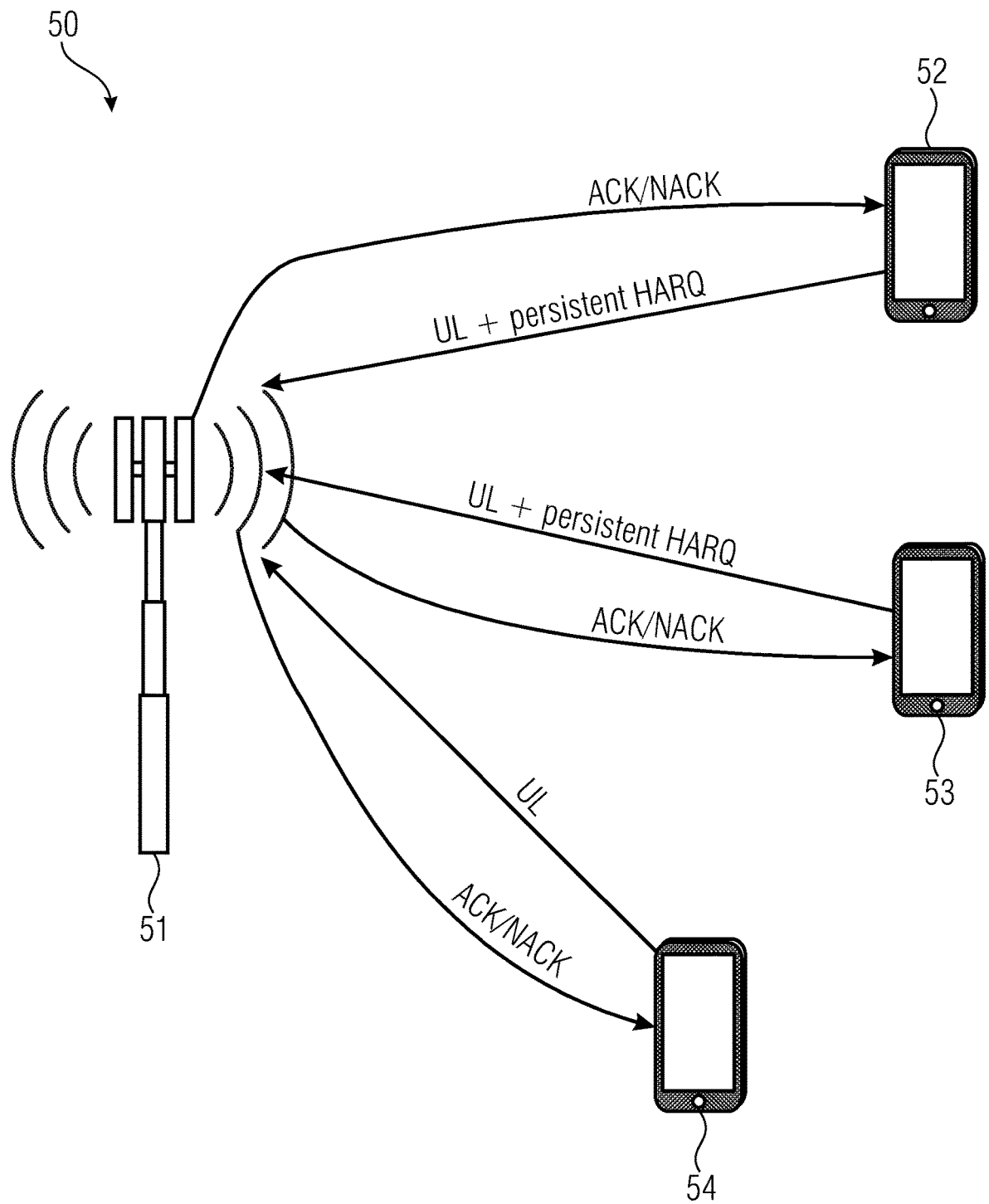
FIG. 5 shows a method according to an example.

FIG. 5 shows a system 50 (which may implement, for example, the system 20). In the system 50, a BS 51 (which may be, for example the BS 21) may obtain data in uplink (UL) from a plurality of UEs 52-54 (which may be, for example, as UEs 22 and 23). The BS 51, operating as a receiver and implementing, for example, the method 30, may transmit ACK/NACK messages to the UEs 52-54 in response to their transmissions and redundancy (re)transmission.

Figure 6:
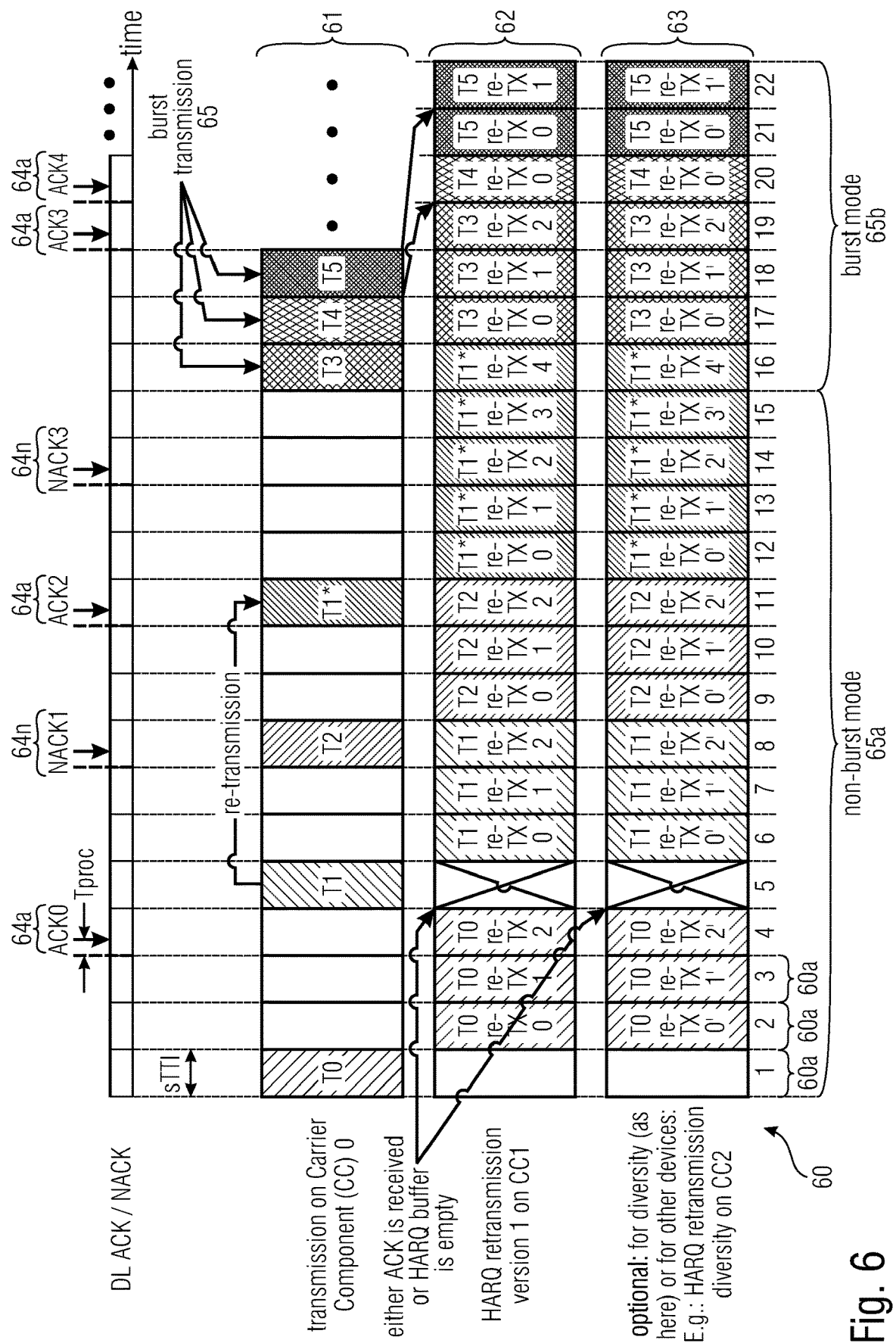
FIG. 6 shows a method according to an example.

FIG. 6 shows an example of communication. The communication may be, for example, in UL (from UEs to a BS). The communication may follow a scheduling (such as an allocation of physical resources to particular UEs, which may by cyclical in some examples). The scheduling may be dynamic or non-dynamic. The scheduling may have been signalled by a scheduler (which may be the BS) to the UEs. In this case, at least 22 physical resources 60a are divided among three channels (which may be, in this case, carrier components 61, 62, 63). There may be defined 66 physical resources in FIG. 6. Each channel may comprise a sequence (e.g., a temporal sequence) of physical resources (e.g., blocks), each of them occupied (or potentially occupied) by a transmission (UL or DL according to different examples).

According to the particular example and/or the scheduling, the first channel 61 may support the transmission of messages T0, T1, T2, T3, T4, T5, etc. ARQ and/or HARQ techniques may be implemented. The first channel 61 may comprise dedicated resources.

The transmissions on the first channel 61 (e.g. a carrier component CC0) may be scheduled and/or performed in a plurality of (e.g., a sequence of) time slots 60a (e.g., short transmittal time intervals, sTTIs).

A second channel 62 (e.g. a carrier component CC1) may support redundancy transmissions of messages T0, T1, T2, etc., which are indicated as T0re-TX0, T0re-TX1, T0re-TX2, etc. for the redundancy transmissions of T0; T1re-TX0, T1re-TX1, for redundancy transmissions of T1; and so on. These redundancy transmissions may be, in examples, HARQ retransmissions. In some cases (e.g., in mode 65a), the physical resources in the second channel 62 may be dedicated (e.g., allocated to particular UEs and/or transmissions). In some cases (e.g., in mode 65b), in UL, the physical resources in the second channel 62 may be grant-free (e.g., non-scheduled, open to competition).

The transmissions on the second channel 62 (e.g. a carrier component CC2) may also support redundancy (re)transmissions (which may be the same or different of the data inserted in the physical resource in the same time slot). In some examples, the retransmissions in CC2 may be offset or staggered with respect to (non-timely aligned to) the retransmissions in CC1. In some examples, T0re-TX1' (transmitted at the time slot 3 in CC2) may be the same of T0re-TX0 (transmitted in time slot 0 in CC1); T0re-TX2' (transmitted at the time slot 4 in CC2) may be the same of T0re-TX1 (transmitted in time slot 1 in CC1); and so on.

In examples, CC1 and CC2 may be used for different transmissions (not necessarily for retransmitting the same data or for the same redundancy transmission). In examples, different channels (e.g., CC1 and CC2) may be aggregated to the main transmission channel (e.g., CC0) during resource allocation and/or resource assignment (e.g., scheduling).

In some examples, only a non-burst communication (in UL or DL) may be used. In some examples, only a burst communication (e.g., in UL) may be used. In some examples regarding UL, both a non-burst communication and a burst communication may be used (e.g., in different time periods and/or according to selections, e.g., operated by the BS).

In the non-burst communication 65a, all the blocks may be dedicated resources: the scheduling defines, to example, that the time slot 1 in the first channel CC0 61 is a dedicated resource uniquely assigned to a particular UE (the one that transmits T0); the time slots 5 and 11 in the first channel CC0 61 are dedicated resources uniquely assigned a particular UE (the one that transmits T1); and the time slot 8 in the first channel CC0 61 is a dedicated resource uniquely assigned a particular UE (the one that transmits T2).

The scheduling may also define that the time slots 2-5 of the first and second channels CC1 and CC2 (62, 63) are dedicated resources uniquely assigned to a particular UE (the one that transmits T0); the time slots 6-8 and 12-16 are dedicated resources uniquely assigned to a particular UE (the one that transmits T1); and the time slots 9-11 are dedicated resources uniquely assigned to a particular UE (the one that transmits T2).

The scheduling may also define that some physical resources are not defined (e.g., reserved physical resources or used for different communications).

In operation, according to the scheduling, a first UE may transmit T0 at time slot 1 (blocks 11-11", 41) in the physical channel CC0.

The same UE may perform redundancy (re)transmissions of T0 (in some cases, in different versions, e.g., with precoding, or incrementally, or in the same versions) in time slots 2-4 (e.g., blocks 12-12", 13", 42) in physical channels CC1 and CC2.

Meanwhile, the receiver (which may be the BS 21 or 51) receives the transmissions and redundancy transmissions (e.g., the receiver may implement the method 30).

The receiver may perform the validity check of the transmissions and redundancy transmissions (e.g., at 32). The receiver may therefore transmit (at 35) an ACK message 64a (here indicated with ACK0). When ACK0 is received by the transmitting UE, the UE may determine that the data has been correctly received by the receiver (e.g., at block 46) and may stop (e.g., at block 44) retransmitting redundancy data to the receiver (a processing delay Tproc may be needed).

Therefore, in the channels CC1 and/or CC2 in time slot 5 (corresponding to a dedicated resource reserved for the UE that has transmitted T0) is not occupied by a transmission, hence reducing the payload.

At time slot 5, another UE has the right of transmitting data T1 in the first channel CC0. Redundancy (re)transmissions may be performed at time slots 6-8 in the second and/or third resource channels CC1 and CC2.

However, in this case, the receiver has determined, at block 32, that no data (transmitted or retransmitted) has been properly decoded. Therefore, (at block 34) the receiver has transmitted a NACK message (NACK1) 64n to the UE that has transmitted T1.

As at time slot 9 there are no physical resources assigned to the UE to transmit T1 (e.g., as verified at blocks 48 and 49), the UE shall be waiting, at 45, before retransmitting a version of T1, for the its next dedicated resource. According to the scheduling, in the subsequent dedicated resources (e.g., time slot 8 in the resource CC0 and time slots 9-11 in the second and third resources CC1 and CC2) another UE has the right of performing transmissions and retransmission (e.g., for data T2). During the time slots 9 and 10, in particular, the UE that has transmitted T1 remains waiting at 45.

However, according to the scheduling the dedicated resource corresponding to the time slot 11 at the channel CC0 is assigned to the same UE that has transmitted T1. Therefore, the UE may move from block 45 to block 42 and perform a redundancy transmission of T1 (indicated as T1*). T1* may be, in examples, an ARQ retransmission of T1.

Further, in time slots 12-16 in the second and third channels CC1 and CC2, further redundancy transmissions of T1* (and of T1) may still be performed. A NACK3 is received at time slot 14, implying that the transmissions and redundancy transmissions of T1 have not been successful yet. The redundancy transmissions of T1* may be HARQ retransmissions, in examples.

The operations in the non-burst communication 65a may also been performed in DL, e.g., from the BS to a plurality of UEs. In these cases, T0, T1, T2 refer to transmissions directed to a particular UE from the BS as defined by the scheduling. In examples, the burst mode is open to UL communications, only.

It is possible to implement a burst mode (indicated in the figure as burst portion 65b). The burst mode may be activated by the BS and communicated to the UEs by signalling, for example. In the figure, the burst mode starts at time slot 16 and may be completely independent from the scheduled communications at 65a.

Even in burst mode, in at least one channel (e.g., CC0 61) the communications may be scheduled. For example, dedicated resources are defined in time slots 16, 18, 19, and assigned to transmissions T3, T4, T5, respectively, which are to be performed by UEs which are in general different UEs. To the contrary, in other channels (e.g., CC1 and CC2) non-dedicated resources are defined. Therefore, a competition may occur among different UEs.

The physical resource associated to the time slot 16 and the first channel CC0 is uniquely associated to the transmission T3. Further, the UE that has transmitted T3 may occupy the subsequent time slot 17 in the second and third channels CC1 and CC2, for performing redundancy transmissions of T3. The UE may perform an instance of the method 40b, for example. Accordingly, the UE may cycle between blocks 42 and 46 and perform redundancy transmissions of T3.

Notably, while the UE transmits redundancy versions of T3, other UEs cycle (in their instances of method 40b) by repeating block 41b until they find a non-dedicated resource free.

In this case, in the second and third channels CC1 and CC2 the time slots 18 and 19 are still occupied by retransmissions of redundancy versions of T3 until an ACK3 is transmitted by the BS. Accordingly, the UE that transmitted the retransmissions of T3 moves from 46 to 44.

Accordingly, the non-dedicated resources (grant-free resources) in time slot 20 on CC1 and CC2 become free. Therefore, in CC1 and CC2 a retransmission of T4 (which was transmitted on slot 17 in the first channel CC0 but could not be retransmitted in view of the repeated retransmissions of T3 in slots 18 and 19) is possible only at slot 20. Therefore, the UE that transmitted T4 in CC0 at slot 16 cycles repeating block 41b up to time slot 20 up to slot 20, where the redundancy transmission of T3 may be performed.

The same applies to the UE that has transmitted T5 in CC0 at slot 18, which cycles repeating block 41b up to slot 21, when it determines that the physical resources at time slot 21 in CC1 and CC2 are free.

The example of FIG. 6 may implement operations of the example of FIG. 4c. T0, T1, T2 may be transmitted in CC0 at block 41 of the method 40c. The HARQ retransmissions (e.g., T0re-TX0 and so on) may be transmitted in CC1 and CC2 at block 42c. For Example, in CC1 and CC2 at the time slot 5 there is no HARQ retransmission, as block 43c has output "YES" towards block 44 (end). To the contrary, at time slot 11, in CC0, a ARQ retransmission of T1 (indicated with T1*) has been performed according to block 45c. At time slots 12-16, in CC1 and CC2, HARQ retransmissions of T1* (e.g., T1*re-TX0 and so on) are performed according to block 42c.

Figure 7:
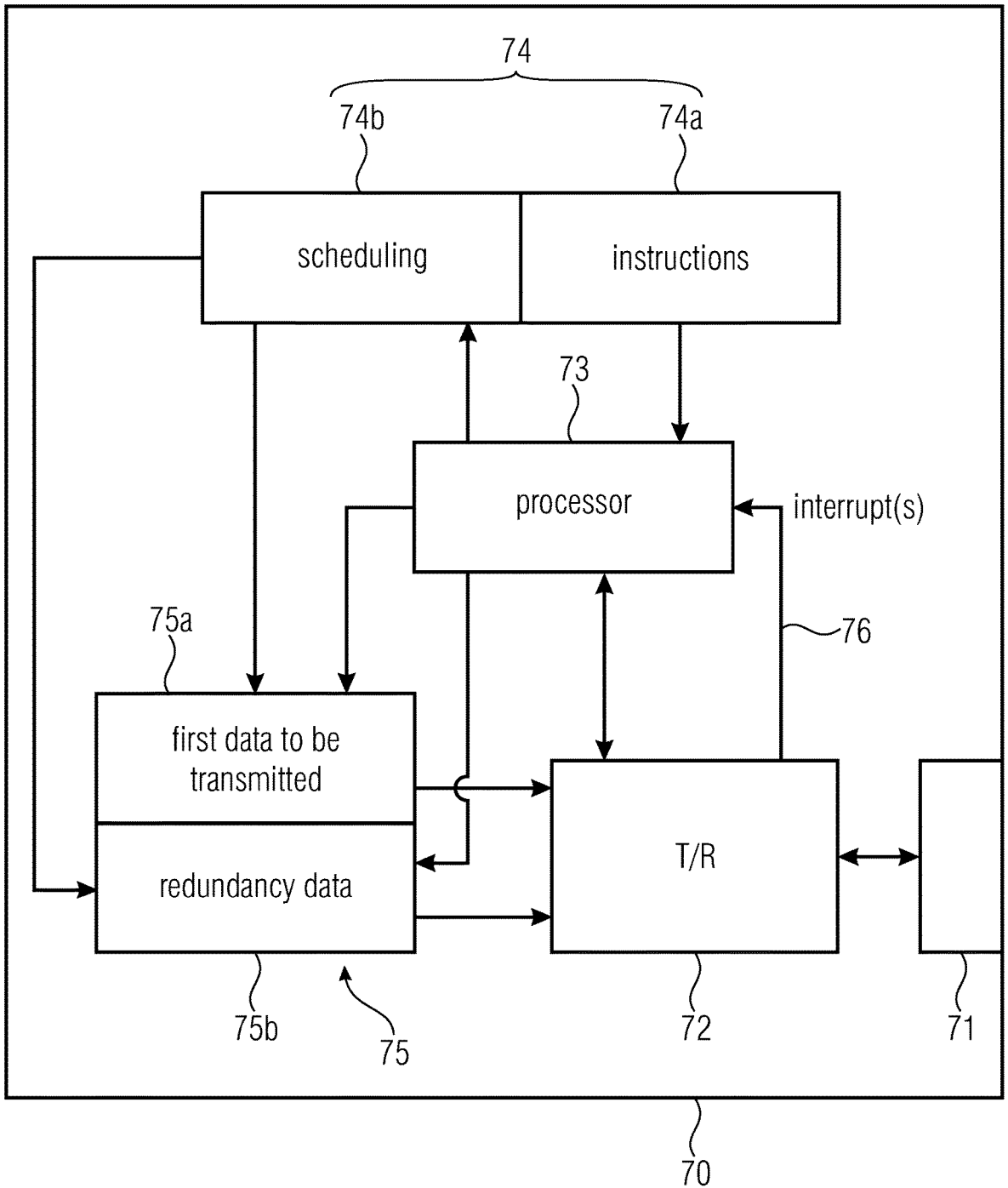
FIG. 7 shows a device according to an example.

FIG. 7 shows a communication device 70 which may be, for example, a UE (e.g., 22, 23, 52-54) or a BS (e.g., 21 or 51). The communication device 70 may be, for example, a transmitter. The communication device 70 may comprise an antenna 71. The communication device 70 may comprise a transmission/reception, T/R, module 72 (which may operate, for example, in the medium access control, MAC, layer and/or the physical layer). The T/R module 72 may transmit signals to and/or receive signals from the antenna 71. The communication device 70 may comprise a processor 73, which may control at least some of the parts of the communication device 70. The communication device 70 may comprise a storage space 74.

The storage space 74 may comprise a non-transitory memory unit 74b which, when executed by a processor (e.g., the processor 73) may cause the processor to perform at least one of the methods above and/or below and/or to implement at least one of the transmitters (UEs or BS) discussed above and/or below. The storage space 74 may also comprise scheduling data (e.g., in a transitory memory unit 74b), which may, for example, allocate time slots in association to physical resources.

The storage space may comprise a buffer 75 in which data to be transmitted in different physical resources are inserted. The buffer 75 may comprise, for example, a dual-port device which may obtain data from (and in case also transmit to) the processor 73 and may give data to (and in case also receive data from) the T/R module 72. The buffer 75 may be configured according to the scheduling data 74b. Each dedicated resource may be associated to a data which may be written in a memory location, e.g., organized as a matrix. In case of grant-free transmissions, a queue may be implemented.

The buffer 75 may comprise a first data transmission portion 75a in which the first data to be transmitted are stored before being output to the T/R module 72 for transmission on a dedicated resource and/or on a grant-free resource, according to the specific example.

The buffer 75 may comprise a redundancy data portion 75b in which redundancy data are inserted before being output to the T/R module 72 for transmission on a dedicated or non-dedicated resource. The portion 75b may be seen as a queue in which several redundancy data are inserted. The redundancy data may be exact repetitions and/or incremental redundancy data, according to the example. Where the redundancy data are to be transmitted in non-dedicated resources (e.g., in the mode 65b, open to competition, of FIG. 6) the T/R module 72 may also verify if a non-dedicated resource is free.

In the transmitter 70, an ACK or NACK message received from the receiver may be provided from the antenna 71, for example, to the T/R module 72 and/or the processor 73. Additionally or alternatively, an interrupt line 76 may be provided in input to the processor 73, for example, for providing the information of an ACK message being received (e.g., for the purpose of block 46). In that case, in the register space, the data related to the retransmissions may be deleted or flagged as to be non-transmitted.

The communication device 70 may also be, for example, a receiver (e.g., it may be both a transmitter and receiver), and the receiver may be, for example, a UE or a BS. When a message is received (e.g., by the antenna 71), the validity of the message may be checked through a validity check (which may be, for example, implemented in the T/R module 72). The message may then be provided to the processor 73. An ACK or NACK message to be transmitted back to the transmitter may be provided to the antenna 71, for example, by the T/R module 72 and/or the processor 73. The processor 73 may execute instructions for the reception of messages, the instructions being stored in the non-transitory storage memory unit 74. Among these instructions, the processor 73 may execute instructions for performing the method 30. The receiver 70 may perform, for example, method 30 or method 30b. It is possible to implement an automatic repeat request (ARQ) technique, in which the transmitter waits for an ACK message. It is possible to implement a hybrid ARQ (HARQ) (e.g., a hard-HARQ technique), in which at least some of the repetitions are transmitted without necessity of request (no necessity of waiting for the ACK or NACK message).

Figure 8:
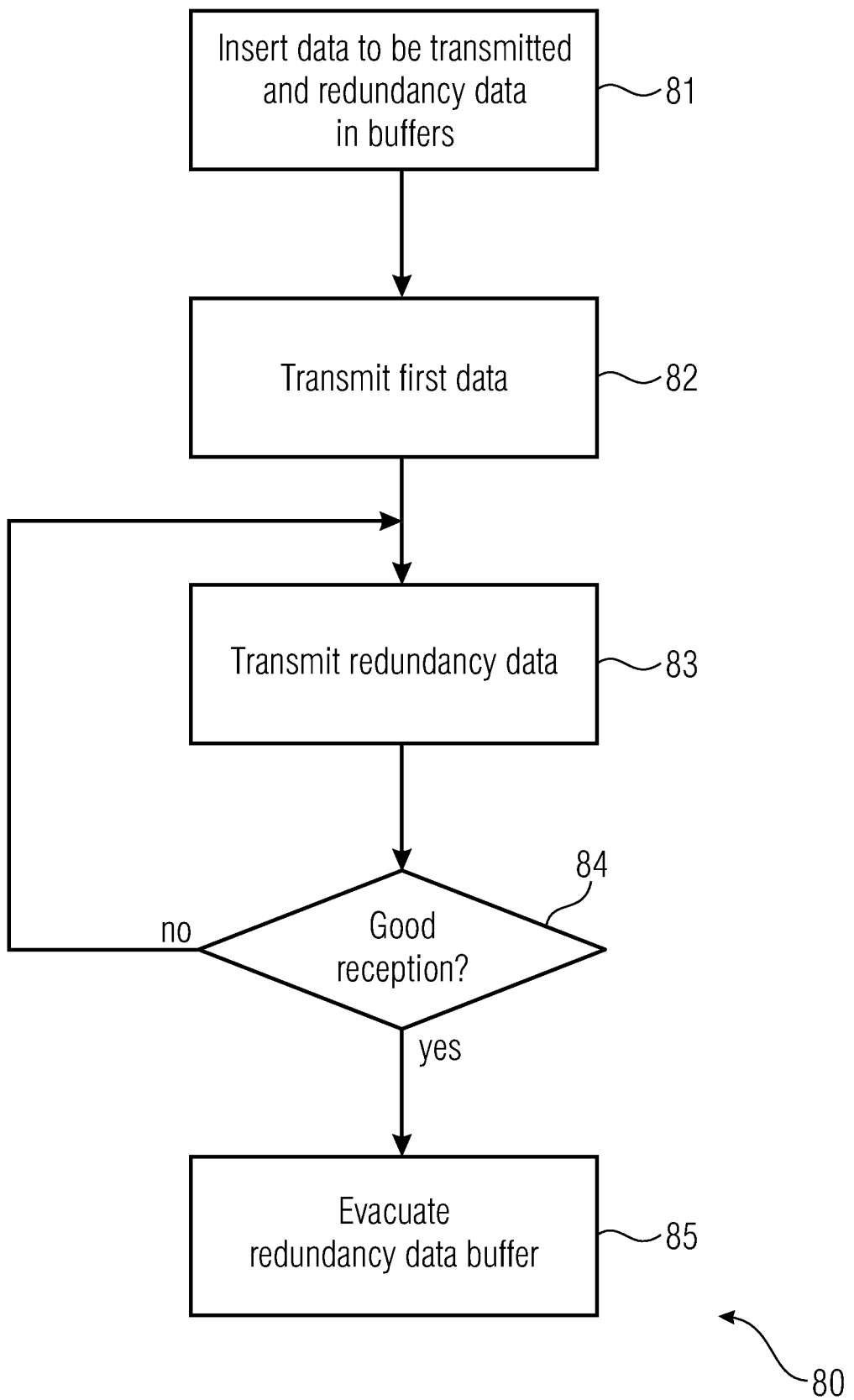
FIG. 8 shows a method according to an example.

FIG. 8 shows an example of method 80 for preparing the transmissions of the redundancy transmissions, e.g., by managing the buffer 75.

At 81, the method 80 may provide inserting data to be transmitted (e.g., T0, T1, T2) the first transmission buffer 75a and inserting redundancy data for retransmission in the redundancy buffer 75b.

At 82, the method 80 may provide transmitting the first data 81 and redundancy data 83. Even if in the figure blocks 82 and 83 are represented in sequence, they may also be parallel in some cases (e.g., using different channels in the same time slot for both the first data transmission and the redundancy transmission).

Thereafter, the method 80 may provide, at 84, checking whether the data transmitter or retransmitted have been successfully received by the receiver. This check may be performed, for example, by checking the reception of the ACKs/NACKs (e.g., at 46).

In case of negative reception (e.g., no ACK received or NACK received), the method 80 may move to perform further redundancy transmissions.

Redundancy transmissions may comprise, for example, retransmissions of messages. Redundancy transmissions may comprise, for example, transmissions parts of previous messages (e.g., only a redundancy part is retransmitted).

In case of positive reception (e.g., ACK received), the method 80 may move to evacuate (e.g., by deleting) the redundancy data buffer at 85. This may be the reason, for example, for the fact that, in FIG. 6, no redundancy data is transmitted in time slot 5 in the CC1 and CC2: the redundancy data buffer 75b, in that time slot, has been found empty by the T/R module 72 and no redundancy transmission has been performed.

Figure 9:
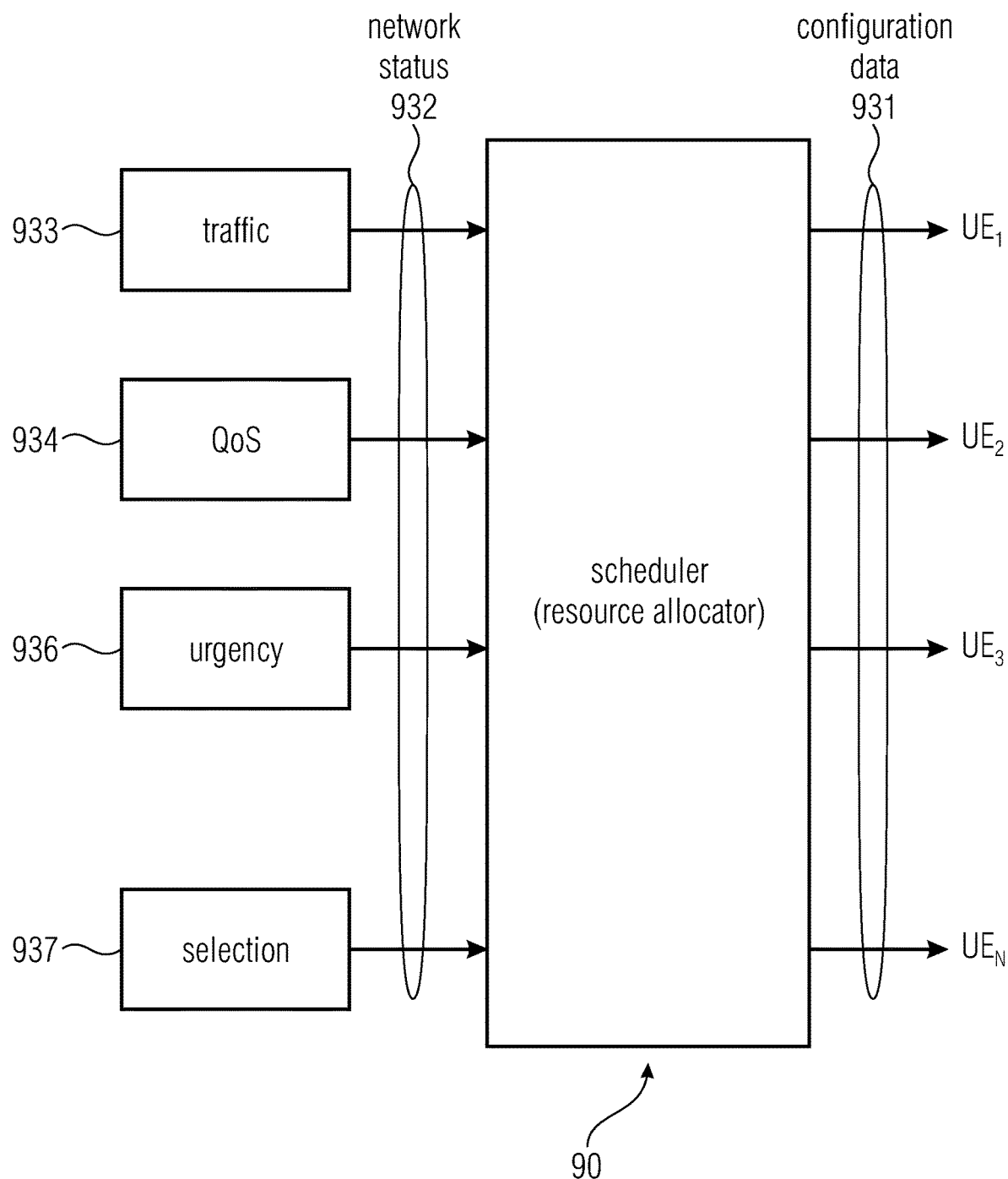
FIG. 9 shows a device according to an example.

FIG. 9 shows a scheduler 930 which may be (or may be a part of) the BS 22. The scheduler 930 may signal configuration data 931 regarding the scheduling. The scheduler 930 may decide, for example, which channels and/or physical resources to be used by each UE on the basis of one or more criteria. Criteria may involve one or more data 933-937. In some examples, at least some of the data 933-937 may contribute to constitute a network status 932. Criteria may be pre-defined and/or defined and/or modified in real time. The scheduling may be dynamic or dynamic.

The scheduler 930 may define the configuration data (scheduling) on the basis of criteria at least in part involving the traffic 933 (or a metrics or an estimation associated thereto) in the network. The traffic may be measured, for example, by keeping in account the number of UEs present within the central device (which may be the BS, such as a g/eNB), the number of current calls, of sessions currently open, and so on. In some examples, if the traffic is not excessive, the quantity of channels (e.g., dedicated resources) may be increased.

The scheduler 930 may define the configuration data (scheduling) on the basis of criteria at least in part involving the quality of service (QoS) 934 (or a metrics or an estimation associated thereto) in the network. The QoS 934 may be measured, for example, by keeping into account statistics of non-properly decoded messages (e.g., UL communications from the UEs to the BS). In some examples, if the QoS is scarce for some particular UEs, the scheduling may be modified by associating an increased number of dedicated resources to UEs which suffer from a low QoS. In some examples, if the QoS is in general scarce, the quantity of dedicated resources may be increased.

Estimations may comprise statistical data (e.g., associated to the geographical location, the human presence, and so on). Estimations may be, at least in part, conditioned by historical data and/or calculated automatically and/or at least partially based on empirical knowledge.

The scheduler 930 may define the configuration data 931 (scheduling) on the basis of criteria at least in part involving the urgency 36 of communications (call communications, special sessions, etc.), e.g., for safety-related purposes (first responder, and so on). Examples may be ultra-reliable low-latency communications (URLLC). The UEs needing urgent communications may be assigned to use additional dedicated resources by the scheduler 930. To the contrary, dedicated resources may be reduced for UEs which do not need urgent communications.

The scheduler 930 may determine the configuration data 931 (scheduling) on the basis of criteria at least in part involving a selection 937. Selected UEs may be assigned to additional dedicated resources. Non-selected UEs may be awarded with given a decreased (or null in some examples) quantity of dedicated resources. A selection may be operated, for example, by a user's request (e.g., as an additional service provided by the service provider managing the network). Accordingly, increased communication capabilities and/or reliability and/or speed may be offered to selected users.

Notably, the scheduler 90 may operate in real time, e.g., by changing the criteria on the basis of the different network status.

The scheduler may therefore perform a priority ranking, in which higher-ranked UEs may be awarded with increased number of dedicated resources with respect to lower-priority UEs. With reference to FIG. 6, it may be assumed that the device transmitting T1 (associated to time slots 5 and 11 in CC0; 6-8 and 12-16 in CC1 and CC2, e.g., 18 dedicated resources) is better ranked than the device that transmits T2 (associated to time slot 8 in CC0 and 9-11 in CC1 and CC2, e.g., 7 dedicated resources). The ranking between different UEs may follow, for example, any of the criteria based on 933, 934, 936, and 937 and, more in general, on the network status 932.

The criteria for assigning dedicated resources to different UEs may evolve in real time on the basis of the status of the network (situation of the UEs).

In examples, the scheduler 90 is used to initiate or conclude any of the methods 10-10", 30, 30b, 40-40c, 50, 60, and 80. Therefore, the scheduler 90 may decide that these methods are to be used, in particular when the metrics on the 933, 934, 936, and 937 and, more in general, on the network status 932, determine a bad status of the network (e.g., low QoS and/or metrics under a threshold) or a necessity of performing urgent communications (e.g., URLLC).

In view of the above, a solution has been provided to the problem of the time needed for handshaking of packets early detected as corrupted in time-critical/mission-critical communication. In general terms, the need for periodic or aperiodic retransmission with probability for more retransmissions may produce delays that does not fit the ultra-low latency requirements.

According to examples, at least of some of the following considerations E1, E2, E3 may be valid:
- E1: Data may be transmitted on dedicated resources; which may be, for example, a short-period SPS. The retransmission HARQ blocks may be computed during/before the transmission of the original data (based on the MCS and selected TBS).
  - P1: In case of burst transmission, a continuous incremental redundancy (HARQ operation) may be performed with different number depending on:
    - S1: the selected MCS (which indicates the amount of saved redundancy in the HARQ buffer) and/or
    - S2: The priority of the original data; high priority data needs more HARQ blocks to be transmitted and low reliability needs less HARQ blocks
  - P2: The entire HARQ processed blocks may be transmitted sequentially until either:
    - S1: the minimum code rate for the selected modulation-coding scheme (MCS) is reached; henceforth, the MCS has to be selected as robust (as low) as needed or the available persistent retransmission resources
    - S2: the next new transmission has to be started in the next short subframe (or sTTI). Hence, old retransmission has to be discarded and presume a NACK is received (if no ACK received forehand) switching the ARQ process (see E3). Otherwise, extra HARQ can be continued on parallel resources (see E2);
- E2: The HARQ versions can be transmitted on "same sTTI" or the next "sTTI". The latter can be fitted to the existing FDD and TDD uplink and Downlink frame structure. For the "same sTTI" (without precluding transmitting HARQ onto the next sTTI(s) as well).
  - P1: More carrier components CCs (examples of channels) may be used to transmit the HARQ versions; and/or
  - P2: The CC(s) may be used to transmit different HARQ versions; and/or
  - P3: The CC(s) can transmit the same HARQ versions (simultaneously) to guarantee:
    - S1: multiple redundancy in case of Free grant uplink transmission; and/or
    - S2: multiple versions of the same HARQ component to satisfy chase combining HARQ (CC-HARQ) on the HARQ transmitted part. This can be utilized by maximum ratio combining the received HARQ frames at the receiver
  - P4: Unlicensed bands may be used for persistent (semi-continuous) HARQ transmission; and/or
- E3: HARQ Process reaction at the receiver:
  - P1: If the data is received correctly, the HARQ mechanism at the receiver grants an ACK at any early stage in the time line. Once this decoded at the Transmitter, the HARQ bits are removed from the buffer freeing one place of the SAW processes; and/or
  - P2: Else, if ACK is not required, it will be skipped and transmitter only evacuate the HARQ buffer if all sent; and/or
  - P3: Else, if data is received corrupted, a NACK is generated after the last HARQ buffer block is received or time for new transmission is urging. Hence, if NACK is received, the new transmission is scheduled to the next earliest transmission slot. This will be indicated, e.g., with a new data indicator ID or leaving the decision to the ARQ process in upper layers.

At least some of the examples may be summarized using at least some of the following considerations:
First, an idea is based on short period semi-persistent scheduling (SPS) with different UL or DL granting; leaving arbitrary different subframes between each transmission.

Second, HARQ retransmissions may be transmitted parallel to the main transmission stream, i.e., on other carrier component(s), spatial sublayers, or time splits.

Third, in examples, instead of sending a periodic ACK/NACK requests (after 4 TTI/sTTI of successful reception), they are either:
  If ACK, then as early as possible or skipped for ultra-low latency if not needed; and/or
  If failure, NACK is sent once the physical resources are pointing to a new transmission ID or last HARQ buffer block is indicated.

Fourth, FIG. 6 is a sketch based on FDD and granted SPS. However, an extension to TDD or any duplexing scheme is straight forward and is a matter of the frame structure.

The HARQ processing may use a Stop-AND-Wait (SAW) technique with multiple parallel SAW processes; every process may represent a transport block (TB) with a HARQ circular buffer of systematic bits and redundancy bits. Further, the data may be transmitted on dedicated resources; which may be in a short-period SPS. Those grants maybe also un allocated (by scheduling) to specific users where it uses, e.g., for UL transmissions; in this case, contention based transmission.

The retransmission-HARQ blocks may be computed during the transmission and starts to be transmitted on the "same sTTI" or the next "sTTI" on different carrier components (CC). Gradually, the entire HARQ processed blocks may be transmitted until either:
  the minimum code rate for the selected modulation scheme is reached, or
  the next new transmission has to be started in the next short subframe (or sTTI).

See FIG. 6 and the related discussion above for further details. This figure shows Partial collision with multilevel QoS detection allowing controlled sharing and limited/partial collision (Multiplex burst HARQ). Here, single/multiple CC, fixed physical resources for HARQ (grant free mechanisms works similarly), and arbitrary limited HARQ slots may be sued. 1 delayed sTTI for the retransmission may be assumed; however, does not preclude same sTTI HARQ transmission.

In examples, if a data is received correctly and ACK is mandatory, the HARQ mechanism grants an ACK at any early stage in the time line, the HARQ bits are removed from the buffer freeing one of the SAW processes. Otherwise, the HARQ buffer is automatically evacuated when the last HARQ block is transmitted. However, if a NACK is received, the new transmission is scheduled to the next earliest transmission slot. This may be indicated, e.g., with the new data indicator ID.

In case of burst transmission (e.g., 65b), a continuous incremental redundancy (HARQ operation) may be transmitted with different number depending on:
- The MCS selected for the original transmission, the amount of saved redundancy in the HARQ buffer, and the MCS selected for the HARQ retransmission
- The priority of the original data; high priority data needs more HARQ blocks to delayed avoid retransmission and prefer dropping low priority data Finally, in this patent idea, the HARQ information can occupy parallel carrier component which can be shared with other URLLC devices in frequency (more carrier component as in FIG. 1) or time (modifying figure one to assume TDMA between retransmission in UL and DL) or Unlicensed Frequency Band if possible.

According to examples:
1. It may be assumed to have an ultra-reliable ultra-low latency communication (URLLC) with short-transmission time interval (sTTI); and/or
2. An SPS with short scheduling period is assumed with homogenous or non-homogenous physical resource spacing in time (See FIG. 6) and/or
3. Additionally, a burst (continuous) transmission with incremental redundancy may be assumed based on priorities, MCS selected (HARQ buffer length); and/or
4. Retransmission can only occur if NACK is received; and/or
5. A physical resource skipping may be assumed to be a NACK after timeout period. Hence, the receiver is forced to send ACK again if the frame was successfully decoded; and/or
6. The HARQ process may be Asynchronous HARQ;
7. However, a synchronous HARQ may still need modifications to FIG. 6 as follows:
   i. sSPS transmission gaps are equidistance
   ii. ACK/NAC has to transmitted before the next physical resource and retransmission (if needed) has to occupy the second following physical resource
8. Both adaptive and non-adaptive HARQ transmission are assumed, i.e., with information set in the new data indicator in DCI0 (adaptive) or ACK/NACK sent in the PHICH (non-adaptive)

At least for some of the examples, it is possible to define that:
1—A method is developed to guarantee parallel retransmission to avoid collision with SPS granted devices and to guarantee the minimum short retransmission time. Herein, the retransmission delay has to be measured versus the needed reliability and maximum possible end-to-end latency. For this we assumed a semi-persistence HARQ retransmission which only stops (that is why it is a semi-persistence) once a parallel ACK is received or the HARQ buffer is emptied.
2. The method of aspect 1 assumes that the request scheduling (RS) is performing SPS and captures all the information needed for QoS, channel state information, urgency of transmission, etc.
3. Based on aspect 1 and satisfying aspect 2, the HARQ buffer size(s) and the possible retransmission HARQ blocks are determined from the MCS selected and the QoS.
4. Based on aspect 1 and the retransmission is performed on an aggregated carrier component (CC) to avoid collision with another SPS granted devices.
5. Based on aspect 1 and aspect 4, a dedicated CC can be scheduled in either frequency or time between URLLC devices or unlicensed frequency band
6. Based on aspect 1 and 5, retransmission may be duplicated on multiple carrier components for reliability if few URLLC devices are operating
7. Based on aspect 1, the HARQ process support can be either an asynchronous HARQ, i.e., only triggered by the receiver in case of failure or synchronous. In case of synchronous HARQ, the HARQ locations are scheduled with the sSPS granting reducing the total overhead.
8. Based on aspect 1 and 7, both adaptive and non-adaptive HARQ can be supported.
9. Based on aspect 1, a burst and non-burst transmission can be supported. However, for burst transmission, the HARQ process delay can be reduced by an early ACK.
10. Based on aspect 1 and essential for aspect 9, the HARQ process runs multiple (1 to 8) SAW processes.

Some advantages of examples are here resumed. Different to [10], the ACK is not augmented leaving a chance for short reaction time. Additionally (and particularly advantageous):
- HARQ blocks can be transmitted on parallel resources simultaneously (with data or delayed). For this, multiple CCs or Unlicensed can be used ACK may be received early (evacuating the HARQ buffer)
- HARQ process can be limited with arbitrary number of retransmissions Frame HARQ retransmissions numbers and MCS are based on each frame priority
- Multiple similar HARQ on parallel CC/resources can be utilized in cache combining HARQ mechanism with, e.g., MRC process.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier.

In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are merely illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

ACRONYMS

| | |
|---|---|
| eNB | Evolved Node B (3G base station) |
| LTE | Long-Term Evolution |
| UE | User Equipment (User Terminal) |
| RRM | Radio Resource Management |
| TDD | Time Division Duplex |
| FDD | Frequency Division Duplex |
| OFDMA | Orthogonal Frequency-Division Multiple Access |
| CQI | Channel Quality Information |
| CRC | Cyclic Redundancy Check |
| SPS | Semi-persistent Scheduling |
| DCI | Downlink Control Information |
| UL | Uplink |
| DL | Downlink |
| (s)TTI | (short) Transmission Time Interval |
| PUSCH | Physical Uplink Shared Channel |
| PUCCH | Physical Uplink Control Channel |
| PDSCH | Physical Downlink Shared Channel |
| PDCCH | Physical Downlink Control Channel |
| URLLC | Ultra-reliable Low-latency Communications |
| SR | scheduling request |
| HARQ | hybrid automatic repeat request |
| QoS | hybrid automatic repeat request |
| URLLC | ultra-reliable and low latency communications |
| MCS | Modulation coding scheme |
| MA | Multiple access |

REFERENCES

Papers

[1] RP-150465, New SI proposal: Study on Latency reduction techniques for LTE, 3GPP RAN Plenary No. 67, Shanghai, China

[2] 3GPP TS 36.211, Evolved Universal Terrestrial Radio Access (EUTRA); "Physical Channels and Modulation", Release 13, V13.1.1.

[3] 3GPP TS 36.212, Evolved Universal Terrestrial Radio Access (EUTRA); "Multiplexing and channel coding", Release 13, V13.1.1.

[4] 3GPP TS 36.213, Evolved Universal Terrestrial Radio Access (EUTRA); "Physical layer procedures", Release 13, V13.1.1.

[5] K. C. Beh, A. Doufexi, and S. Armour, "Performance evaluation of hybrid ARQ schemes of 3GPP LTE OFDMA system," in Proceeding of IEEE 18th International Symposium on Personal, Indoor and Mobile Radio Communications (PIMRC), Athens, Greece, Sept. 2007, pp. 1-5.

[6] H. Wang, J. Han and S. Xu, "Performance of TTI Bundling for VoIP In EUTRAN TDD Mode," *Vehicular Technology Conference, 2009. VTC Spring 2009. IEEE 69th*, Barcelona, 2009, pp. 1-5.

[7] Y. Zhou, T. Zhang, Z. Zeng, Y. Li and Y. Han, "LTE Uplink Coverage Enhancement Techniques Based on Enhanced TTI Bundling," *Wireless Communications, Networking and Mobile Computing (WiCOM), 2012 8th International Conference on*, Shanghai, 2012, pp. 1-4

[8] L. Yan; X. Fang; G. Min; Y. Fang, "A Low-Latency Collaborative HARQ Scheme for Control/User-Plane Decoupled Railway Wireless Networks," in IEEE Transactions on Intelligent Transportation Systems , vol.PP, no. 99, pp.1-14

[9] M. Weiner, M. Jorgovanovic, A. Sahai and B. Nikolie, "Design of a low-latency, high-reliability wireless communication system for control applications," *2014 IEEE International Conference on Communications (ICC)*, Sydney, NSW, 2014, pp. 3829-3835.

Patent documents

[10] WO/2016/069159: Fountain HARQ for Reliable Low Latency Communication, QUALCOMM

[11] USPTO 20150263829: DL Scheduling and HARQ-ACK Feedback for DL Transmissions in Flexible-TDD Systems without and with Cross-Subframe Scheduling, NEC

The invention claimed is:

1. A method for communicating according to a hybrid automatic repeat request, HARQ, scheme, the method comprising:
performing a first data transmission at a first channel which is a first carrier component;
in at least one physical resource subsequent to the first data transmission, performing at least one redundancy transmission at a second channel which is a second carrier component having grant-free physical resources, wherein the at least one redundancy transmission is performed according to an incremental redundancy for forward error correction, wherein the at least one redundancy transmission is performed, using a listen-before-talk scheme, without waiting for an acknowledgment message;
concluding or postponing the at least one redundancy transmission when a stop condition or a postponing condition is met, the stop condition or the postponing condition including at least the reception of an acknowledgment, ACK, message transmitted on a channel which is different from the first and the second channels.

2. The method of claim 1, wherein the first channel comprises dedicated physical resources.

3. The method of claim 1, wherein the first channel comprises grant-free physical resources.

4. The method of claim 1, further comprising concluding or postponing the redundancy transmission when the stop condition or the postponing condition is met, the stop condition or the postponing condition comprising at least the following condition:
other transmissions are transmitted or are to be transmitted.

5. The method of claim 1, further comprising concluding or postponing the redundancy transmission when the stop condition or the postponing condition is met, the stop condition or the postponing condition comprising at least the following condition:
a maximum number of retransmissions have been performed.

6. The method of claim 1, further comprising concluding or postponing the redundancy transmission when the stop condition or the postponing condition is met, the stop condition or the postponing condition comprising at least the following condition:
a maximum timer is expired.

7. The method of claim 1, further comprising concluding or postponing the redundancy transmission when the stop condition or the postponing condition is met, the stop condition or the postponing condition comprising at least the absence of the allocation of the at least one subsequent physical resource.

8. The method of claim 1, the stop condition or the postponing condition comprising at least one of the following conditions or an "OR"-condition of at least two of the following conditions:
an acknowledgment, ACK, message is received; and/or
a maximum number of retransmissions have been performed; and/or
a maximum timer is expired; and/or
other transmissions are transmitted or are to be transmitted; and/or
the absence of the allocation of the at least one subsequent physical resource.

9. The method of claim 1, further comprising:
before performing the first data transmission, inserting data to be transmitted in a first transmission buffer associated to the first data transmission and, before performing the second data transmission, inserting redundancy data in a second transmission buffer) associated to the at least one redundancy transmission; and
evacuating the second transmission buffer when the stop condition or the postponing condition is met.

10. The method of claim 1, using a technique based on carrier sense multiple access collision detection, CSMA/CD.

11. The method of claim 1, using a technique based on carrier sense multiple access collision avoidance, CSMA/CA.

12. The method of claim 1, further comprising:
performing redundancy transmissions until the postponing condition is met;
waiting for a subsequent resource at disposal for a redundancy transmission;
performing at least one additional redundancy transmission on the subsequent dedicated resource.

13. The method of claim 1, further comprising:
in an initial step, measuring metrics at least in part associated to a network status for initiating subsequent steps when the metrics are under a threshold.

14. The method of claim 1, further comprising:
measuring metrics at least in part associated to a status of the network, so as to assign a greater quantity of redundancy transmissions to devices suffering from not meeting the QoS requirements.

15. The method of claim 1, further comprising:
measuring metrics at least in part associated to a status of the network, so as to assign a greater quantity of redundancy transmissions to devices requesting urgent communications.

16. The method of claim 1, further comprising:
determining a ranking of priorities, so as to assign more redundancy transmissions to higher-priority transmissions.

17. The method of claim 1,
wherein the at least one redundancy transmission comprises a plurality of redundancy transmissions transmitted in a plurality of subsequent resources of the second channel.

18. The method of claim 1,
further comprising an automatic request, ARQ, technique of waiting for a non-acknowledgement, NACK, message, before performing the retransmission in the same physical resource.

19. The method of claim 18, wherein the ARQ retransmission is performed by increasing a power level.

20. The method claim 1,
wherein at least one of the grant-free resources is short-transmission time interval, sTTI.

21. The method of claim 1,
wherein at least one of the grant-free resources is at least one short-transmission time interval, sTTI.

22. The method of claim 1, wherein the scheduling is a semi-persistent scheduling, SPS, or preconfigured resources as a grant-free transmission.

23. The method of claim 1, wherein the communications are long term evolution, LTE, communications, and/or 3rd Generation Partnership Project, 3GPP, and/or 4G, and/or 5G.

24. The device of claim 1, wherein the redundancy transmissions are transmitted in the second channel while the first channel does not transmit the first data transmission.

25. A method for receiving a data, comprising:
receiving a first data at a first channel which is a first carrier component, and, subsequently, receiving at least one redundancy transmission, transmitted using a listen-before-talk technique, at a second channel which is a second carrier component having grant-free resources, wherein the at least one redundancy transmission is transmitted up to concluding or postponing the redundancy transmission when a stop condition or a postponing condition is met, the stop condition or postponing condition including at least the reception of an acknowledgment, ACK, message transmitted on a channel which is different from the first and the second channels, wherein the at least one redundancy transmission is performed according to an incremental redundancy for forward error correction, wherein the at least one redundancy transmission can be received without the transmission of an acknowledgment, ACK, message;
performing a validity check on the first data and/or the at least one redundancy transmission, the method including combining incorrectly received redundancy transmission with previously incorrectly received data to reconstruct the transmitted data; and
transmitting an acknowledgment, ACK, message if the validity check is positive for at least one of the first data and/or the at least one redundancy transmission, and/or transmitting a non-acknowledgment, NACK, message if the validity check is negative for the first data and/or the at least one redundancy transmission.

26. The method of claim 25, where the received data is acquired from a method for communicating according to a hybrid automatic repeat request, HARQ, scheme, the method comprising:
performing a first data transmission at the first channel;
simultaneously to the first data transmission and/or in at least one subsequent physical resource, performing at least one redundancy transmission at the second channel;
concluding or postponing the redundancy transmission when the stop condition or a postponing condition is met.

27. The method of claim 25, wherein the communications are long term evolution, LTE, communications, and/or 3rd Generation Partnership Project, 3GPP, and/or 4G, and/or 5G.

28. A device configured to:
perform communications at a first channel which is a first carrier component;
transmit a first data;
subsequently, perform at least one redundancy transmission at a second channel which is a second carrier component having grant-free physical resources, wherein the at least one redundancy transmission is performed according to an incremental redundancy for forward error correction, wherein the at least one redundancy transmission is transmitted, using a listen-before-talk scheme, without waiting for an acknowledgment message; and
conclude or postpone the redundancy transmission when a stop condition or a postponing condition is met, the stop condition or postponing condition including at least the reception of an acknowledgment, ACK, message transmitted on a channel which is different from the first and the second channels.

29. The device of claim 28, the stop condition or the postponing condition comprising at least two of the following conditions:
a maximum number of retransmissions have been performed;
a maximum timer is expired;
other transmissions are transmitted or are to be transmitted); and
the absence of the allocation of the at least one subsequent physical resource.

30. The device of claim 28,
wherein the first channel comprises grant-free physical resources.

31. The device of claim 28, wherein the first channel comprises dedicated physical resources.

32. The device of claim 28, wherein the first channel comprises grant-free physical resources.

33. A device configured to:
receive a first data on a dedicated resource in a first channel which is a first carrier component and, subsequently, receive at least one redundancy transmission, in the first or in a second channel which is a second carrier component, wherein the at least one redundancy transmission is transmitted, using a listen-before-talk scheme, up to a concluding or postponing the redundancy transmission when a stop condition or a postponing condition is met, wherein the at least one redundancy transmission is performed according to an incremental redundancy for forward error correction, wherein the at least one redundancy transmission can be obtained without waiting for an acknowledgment, ACK, message, the stop condition or a postponing condition including at least the reception of an acknowledgment, ACK, message transmitted on a channel which is different from the first and the second channels;
perform a validity check on the first data and/or the at least one redundancy transmission; and
transmit an acknowledgment, ACK, message and/or a non-acknowledgment, NACK, message on the basis of the result of the validity check.

* * * * *